(12) United States Patent
Abrahamsson et al.

(10) Patent No.: US 12,444,979 B2
(45) Date of Patent: Oct. 14, 2025

(54) DOOR OPERATOR SYSTEM WITH WIRELESS CHARGING CAPABILITY

(71) Applicant: Assa Abloy Entrance Systems AB, Landskrona (SE)

(72) Inventors: Magnus Abrahamsson, Loddekopinge (SE); Johan Kjessler, Lund (SE); Petter Myhrman, Lund (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 695 days.

(21) Appl. No.: 17/608,967

(22) PCT Filed: May 12, 2020

(86) PCT No.: PCT/EP2020/063122
§ 371 (c)(1),
(2) Date: Nov. 4, 2021

(87) PCT Pub. No.: WO2020/234034
PCT Pub. Date: Nov. 26, 2020

(65) Prior Publication Data
US 2022/0216732 A1    Jul. 7, 2022

(30) Foreign Application Priority Data
May 22, 2019 (SE) .................................. 1930168-8

(51) Int. Cl.
*H02J 50/10* (2016.01)
*E05D 15/24* (2006.01)
(Continued)

(52) U.S. Cl.
CPC .............. *H02J 50/10* (2016.02); *E05F 15/67* (2015.01); *H01M 10/44* (2013.01); *H01M 10/46* (2013.01);
(Continued)

(58) Field of Classification Search
CPC .. H01M 10/44; H01M 10/46; H01M 2220/10; E05Y 2900/106; E05Y 2400/66;
(Continued)

(56) References Cited

U.S. PATENT DOCUMENTS 706,626 A * 8/1902 Wood ..................... E06B 7/32
160/195
2,264,643 A * 12/1941 Rowe ................. E05D 15/246
160/209

(Continued)

FOREIGN PATENT DOCUMENTS

AU    2008208555    7/2008
AU    2008208555 A1 * 9/2009 ......... E05B 65/0007
(Continued)

OTHER PUBLICATIONS

Wireless_charging_eliminates_the_cable_mazes_in_your_homes (Year: 2018).*
(Continued)

*Primary Examiner* — John T Trischler
(74) *Attorney, Agent, or Firm* — Wissing Miller LLP

(57) ABSTRACT

A door operator system for opening and closing an opening, comprising a door frame comprising a first frame section and a second frame section on either side the opening. The door is connected to the door frame. A drive unit mounted on the door is moveably connected to first frame section and the second frame section. The drive unit has at least one motor connected to at least one energy storage device arranged to power the at least one motor to move the door from the closed position to the open position. An energy transmitting device is disposed in close proximity to the door and an energy receiving device mounted on the door. The energy transmitting device wirelessly transmits energy to the energy receiving device mounted to the door. The energy receiving device is operatively connected to the at
(Continued)

least one energy storage device for charging said energy storage device.

19 Claims, 14 Drawing Sheets

(51) Int. Cl.
    *E05F 15/67*     (2015.01)
    *H01M 10/44*     (2006.01)
    *H01M 10/46*     (2006.01)
    *H02J 7/34*     (2006.01)

(52) U.S. Cl.
    CPC .............. *H02J 7/345* (2013.01); *E05D 15/24* (2013.01); *E05Y 2201/43* (2013.01); *E05Y 2201/434* (2013.01); *E05Y 2201/716* (2013.01); *E05Y 2201/722* (2013.01); *E05Y 2400/612* (2013.01); *E05Y 2400/614* (2013.01); *E05Y 2400/616* (2013.01); *E05Y 2400/66* (2013.01); *E05Y 2600/46* (2013.01); *E05Y 2900/106* (2013.01); *H01M 2220/10* (2013.01)

(58) Field of Classification Search
    CPC . E05D 15/24; E05F 15/67; H02J 7/345; H02J 50/10
    USPC .......................................................... 320/107
    See application file for complete search history.

(56) References Cited

U.S. PATENT DOCUMENTS

| | | | | |
|---|---|---|---|---|
| 4,236,594 A * | 12/1980 | Ramsperger | ........ | F02N 11/0807 701/2 |
| 4,541,202 A * | 9/1985 | Dockery | ............... | E05F 15/635 49/362 |
| 4,983,963 A * | 1/1991 | Hodgetts | ............ | G06K 7/10336 340/5.72 |
| 5,170,585 A * | 12/1992 | Wen | ...................... | H02J 7/0042 49/358 |
| 5,594,316 A * | 1/1997 | Hayashida | ............... | H02J 50/12 320/108 |
| 5,821,728 A * | 10/1998 | Schwind | ................... | H02J 50/40 320/108 |
| 6,535,133 B2 | 3/2003 | Gohara | ................... | H02J 50/10 320/108 |
| 7,956,495 B2 * | 6/2011 | Jin | ...................... | H02J 7/00045 307/104 |
| 8,169,185 B2 * | 5/2012 | Partovi | ................. | H01F 27/366 320/108 |
| 8,493,033 B2 * | 7/2013 | Banta | .................... | E05F 15/603 320/141 |
| 8,975,772 B2 * | 3/2015 | Lakirovich | ............. | H02J 50/12 307/104 |
| 9,438,069 B2 * | 9/2016 | Hongo | .................... | H02J 50/90 |
| 9,443,651 B2 * | 9/2016 | Kagami | .................. | B60L 53/39 |
| 9,554,411 B1 * | 1/2017 | Hall | ...................... | H02J 50/05 |
| 9,577,466 B2 * | 2/2017 | Ku | ........................ | H02J 50/90 |
| 10,044,229 B2 * | 8/2018 | Partovi | .................. | H01F 38/14 |
| 10,294,708 B2 * | 5/2019 | Quaiser | ................. | E05F 15/668 |
| 10,358,858 B2 * | 7/2019 | Lietz | ........................ | E06B 9/82 |
| 10,396,606 B2 * | 8/2019 | Hall | ...................... | H04B 5/79 |
| 10,435,936 B2 * | 10/2019 | Lietz | ..................... | E05F 15/78 |
| 10,714,987 B2 * | 7/2020 | Hall | ...................... | G16H 40/67 |
| 10,858,202 B1 * | 12/2020 | McNamara | .......... | B65G 1/1375 |
| 11,165,273 B2 * | 11/2021 | Graham | ................. | H01F 27/36 |
| 11,201,500 B2 * | 12/2021 | Partovi | ................. | H02J 7/00041 |
| 11,223,245 B2 * | 1/2022 | Hall | ...................... | H02J 50/05 |
| 11,316,371 B1 * | 4/2022 | Partovi | ................. | G06F 1/1635 |
| 11,332,976 B2 * | 5/2022 | Eichstetter | ............ | E05F 15/77 |
| 11,339,604 B2 * | 5/2022 | Dreyer | ................... | E05F 15/73 |
| 11,342,792 B2 * | 5/2022 | Partovi | ................. | G06F 1/1635 |
| 11,346,141 B2 * | 5/2022 | Gregoriou | ................ | E06B 9/68 |
| 11,349,315 B2 * | 5/2022 | Partovi | ................. | G06F 1/1683 |
| 11,404,909 B2 * | 8/2022 | Partovi | .................... | H02J 50/12 |
| 11,411,433 B2 * | 8/2022 | Partovi | .................... | H02J 50/10 |
| 11,462,942 B2 * | 10/2022 | Partovi | .................... | H02J 50/12 |
| 11,530,566 B2 * | 12/2022 | Van De Wiel | ........ | E05F 15/668 |
| 11,563,345 B2 * | 1/2023 | Hall | ..................... | A61N 1/3787 |
| 11,569,685 B2 * | 1/2023 | Partovi | .................... | H02J 50/05 |
| 11,590,850 B2 * | 2/2023 | Liu | .......................... | H02J 50/10 |
| 11,761,250 B2 * | 9/2023 | Balder | ................... | E05D 15/24 160/188 |
| 11,804,114 B2 * | 10/2023 | Gregoriou | ................ | G08B 5/36 |
| 12,027,873 B2 * | 7/2024 | Partovi | .................... | H02J 50/10 |
| 12,040,625 B2 * | 7/2024 | Partovi | ................. | G06F 1/1683 |
| 12,098,584 B2 * | 9/2024 | Eliasson | ................ | E05D 15/24 |
| 2002/0056233 A1 * | 5/2002 | Gohara | ................... | B60R 16/027 49/360 |
| 2003/0076062 A1 * | 4/2003 | Mullet | ................. | G05B 19/042 318/445 |
| 2009/0079270 A1 * | 3/2009 | Jin | ......................... | H02J 50/90 307/104 |
| 2009/0096413 A1 * | 4/2009 | Partovi | ................. | H02J 7/0013 320/108 |
| 2009/0140858 A1 * | 6/2009 | Gore | ..................... | G08B 29/046 340/547 |
| 2011/0088328 A1 * | 4/2011 | Schaff | ................... | E05F 15/668 49/358 |
| 2012/0092125 A1 * | 4/2012 | Farber | ................... | E05F 15/668 340/5.7 |
| 2012/0112875 A1 * | 5/2012 | Heng | ..................... | E05F 15/43 340/5.71 |
| 2012/0256585 A1 * | 10/2012 | Partovi | ................. | H01F 27/366 320/108 |
| 2013/0026848 A1 * | 1/2013 | Ito | .......................... | B60L 53/37 307/104 |
| 2014/0015341 A1 * | 1/2014 | Kagami | .................. | H02J 50/12 307/104 |
| 2014/0080409 A1 * | 3/2014 | Frankland | ............... | H02J 50/80 455/41.1 |
| 2014/0347009 A1 * | 11/2014 | Hongo | .................... | H02J 50/90 320/108 |
| 2016/0013682 A1 * | 1/2016 | Ostendorf | ............... | H02J 50/60 320/108 |
| 2016/0040469 A1 * | 2/2016 | Lietz | ...................... | E05F 15/70 49/31 |
| 2016/0064988 A1 * | 3/2016 | Ku | ........................ | B60L 53/122 320/108 |
| 2016/0298373 A1 * | 10/2016 | Lietz | ........................ | E06B 9/68 |
| 2017/0086906 A1 * | 3/2017 | Tsuruta | ................... | A61B 90/39 |
| 2017/0138111 A1 * | 5/2017 | Lietz | ........................ | E06B 9/68 |
| 2017/0194809 A1 * | 7/2017 | Partovi | .................... | H02J 50/70 |
| 2017/0194820 A1 * | 7/2017 | Hall | ..................... | A61N 1/3787 |
| 2017/0306696 A1 * | 10/2017 | Slupik | .................... | H02P 25/04 |
| 2018/0051501 A1 * | 2/2018 | Söderqvist | ............... | E05F 15/63 |
| 2018/0337556 A1 * | 11/2018 | Yun | ....................... | E05D 15/0656 |
| 2019/0341818 A1 * | 11/2019 | Hall | ....................... | H02J 50/30 |
| 2019/0363565 A1 * | 11/2019 | Graham | ................. | H01F 27/36 |
| 2020/0024898 A1 * | 1/2020 | Eichstetter | ............... | E06B 9/68 |
| 2020/0044482 A1 * | 2/2020 | Partovi | .................... | H02J 50/10 |
| 2020/0115948 A1 * | 4/2020 | Lietz | ........................ | E06B 9/68 |
| 2020/0199928 A1 * | 6/2020 | Gregoriou | ................ | E06B 9/17 |
| 2020/0220390 A1 * | 7/2020 | Uchida | .................... | H02J 50/12 |
| 2020/0303971 A1 * | 9/2020 | Hall | ...................... | G16H 40/67 |
| 2021/0044147 A9 * | 2/2021 | Partovi | ................. | G06F 1/1635 |
| 2021/0123279 A1 * | 4/2021 | Balder | .................... | E05D 15/24 |
| 2022/0049538 A1 * | 2/2022 | Abrahamsson | .......... | E05F 15/67 |
| 2022/0103024 A1 * | 3/2022 | Hall | ......................... | H02J 50/10 |
| 2022/0115880 A1 * | 4/2022 | Partovi | .................... | H02J 50/10 |
| 2022/0115908 A1 * | 4/2022 | Partovi | .................... | H02J 50/05 |
| 2022/0115909 A1 * | 4/2022 | Partovi | ................. | H02J 7/0047 |
| 2022/0173616 A1 * | 6/2022 | Partovi | ................. | G06F 1/1635 |
| 2022/0181911 A1 * | 6/2022 | Partovi | ................. | H02J 7/0047 |
| 2022/0228416 A1 * | 7/2022 | Dryer | ..................... | E05F 15/70 |
| 2022/0242255 A1 * | 8/2022 | Liu | .......................... | B60L 58/20 |
| 2022/0243518 A1 * | 8/2022 | Abrahamsson | .......... | E05F 15/67 |
| 2022/0262214 A1 * | 8/2022 | Gregoriou | ................ | G08B 5/36 |
| 2022/0285988 A1 * | 9/2022 | Partovi | .................... | H02J 50/05 |
| 2022/0393509 A1 * | 12/2022 | Partovi | .................... | H02J 50/70 |

(56) References Cited

U.S. PATENT DOCUMENTS

| | | | |
|---|---|---|---|
| 2023/0012351 A1* | 1/2023 | Eliasson | E05D 15/24 |
| 2023/0044431 A1* | 2/2023 | Eliasson | E05F 15/67 |
| 2023/0160246 A1* | 5/2023 | Persson | E05D 15/02 |
| | | | 49/42 |
| 2023/0163632 A1* | 5/2023 | Partovi | H02J 50/10 |
| | | | 320/108 |
| 2023/0231417 A1* | 7/2023 | Partovi | H02J 7/0047 |
| | | | 320/108 |
| 2023/0265705 A1* | 8/2023 | Eliasson | E05D 15/242 |
| | | | 49/199 |
| 2024/0348098 A1* | 10/2024 | Partovi | H02J 50/70 |

FOREIGN PATENT DOCUMENTS

| | | | | |
|---|---|---|---|---|
| CN | 106574478 A | | 4/2017 | |
| DE | 102007030081 | | 1/2009 | |
| DE | 102007030081 A1 * | | 1/2009 | E05F 15/632 |
| DE | 102017102599 | | 8/2018 | |
| EP | 2946050 | | 1/2019 | |
| FR | 2968345 | | 6/2012 | |
| JP | 01069244 | | 3/1989 | |
| KR | 20160018023 | | 2/2016 | |
| WO | 2008090586 | | 7/2008 | |
| WO | 2016022534 | | 2/2016 | |
| WO | 2019048395 | | 3/2019 | |
| WO | WO-2023165982 A1 * | | 9/2023 | |

OTHER PUBLICATIONS

FR2968345A1_Human_Assisted_Translation (Year: 2012).*
Chinese Office Action in 2020800521591 dated Feb. 3, 2023.
First Examination Report for Indian Application No. 202147058876, dated Jul. 21, 2023.
International Search Report and Written Opinion in PCT/EP2020/063122 mailed Jul. 21, 2020.
Swedish Search Report in 1930168-8 mailed Dec. 18, 2019.
Office Action in Korean Pat. Appl. No. 10-2021-7041967, mailed Aug. 4, 2024.

* cited by examiner

| Number | Element Name |
|---|---|
| 9 | Door section |
| 9' | Inner face of door |
| 10 | Drive unit |
| 11 | Motor |
| 12 | Energy storage device |
| 15 | Spline joint |
| 17 | Wheel |
| 20 | Control unit |
| 21 | Operator panel |
| 22 | Brake |

| Number | Element Name |
|---|---|
| 8 | Door |
| 9' | Inner face of door |
| 10 | Drive unit |
| 12 | Energy storage device |
| 13 | Energy transmitting device |
| 14 | Energy transmitting device |
| 20 | Control unit |
| 21 | Operator panel |
| 81 | Energy receiving device |
| 82 | Battery charger |
| 84 | Energy transmitting device |
| 89 | Energy consuming device |
| 96 | External power source |

DOOR OPERATOR SYSTEM WITH WIRELESS CHARGING CAPABILITY

This application is a 371 of PCT/EP2020/063122, filed on May 12, 2020, published on Nov. 26, 2020 under publication number WO 2020/234034, which claims priority benefits from Swedish Patent Application No. 1930168-8, filed on May 22, 2019, the disclosure of which is incorporated herein by reference.

TECHNOLOGY FIELD

The present invention relates to a door operator system for opening and closing an opening.

BACKGROUND

A door operator system for an overhead door typically comprises a door connected to a door frame and a drive unit arranged to move the door along the door frame between an open and closed position for opening and closing the opening. The door, which may be a sectional door, is typically used as a garage doors or as an industrial door. The drive unit can further comprise a motor or a mechanical unit such as a spring to move the door.

To achieve a more efficient door operator system that reduces the complexity and the risks of the door operator system during operation, maintenance and installation, a door operator system with drive units mounted to the door has been developed. Such a door addresses several shortcomings and disadvantages with conventional door operator systems by introducing a drive modularity, allows for easier and faster installation and a reduced complexity.

However, such a solution requires power transmission between the drive units mounted to the door panel and a power source typically arranged on a door frame or a wall adjacent to the door. This may lead to complex power transferring systems with large numbers of cables extending between the door and the door frame or contact interfaces in the form of hardware connectors or contact pins between the door blade and external power transfer devices which are highly susceptible to environmental impact in the form of rain, snow, dirt etc.

SUMMARY

An object of the present disclosure is to provide a door operator system which seeks to mitigate, alleviate, or eliminate one or more of the above-identified deficiencies in the art and disadvantages singly or in any combination.

An object of the present invention is to reduce the complexity of the door operator system.

An object of the present invention is to obtain a door operator system that is less sensitive to structural damage to the mechanical parts of the door system.

In this disclosure, a solution to the problem outlined above is proposed. In the proposed solution, a door operator system for opening and closing an opening is described.

In a first aspect, a door operator system for opening and closing an opening is provided. The door frame comprises a first frame section at a first side of the opening and a second frame section at a second side of the opening.

The door operator system further comprises a door arranged to be moved between an open and closed position, the door being connected to the door frame. Also, the door operator system comprises a drive unit mounted on the door, whereby the drive unit is moveably connected to first frame section and the drive unit is moveably connected to the second frame section. The drive unit comprises at least one motor connected to at least one energy storage device arranged to power the at least one motor, the drive unit being arranged to move the door from the closed position to the open position.

The door operator system further comprises an energy transmitting device disposed in close proximity to the door and an energy receiving device mounted on the door. The energy transmitting device is configured to wirelessly transmit energy to the energy receiving device mounted to the door, whereby the energy receiving device is operatively connected to the at least one energy storage device for charging said energy storage device.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something in this document is intended to mean the same as the entity being "configured for", or "intentionally adapted for" doing this very something.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
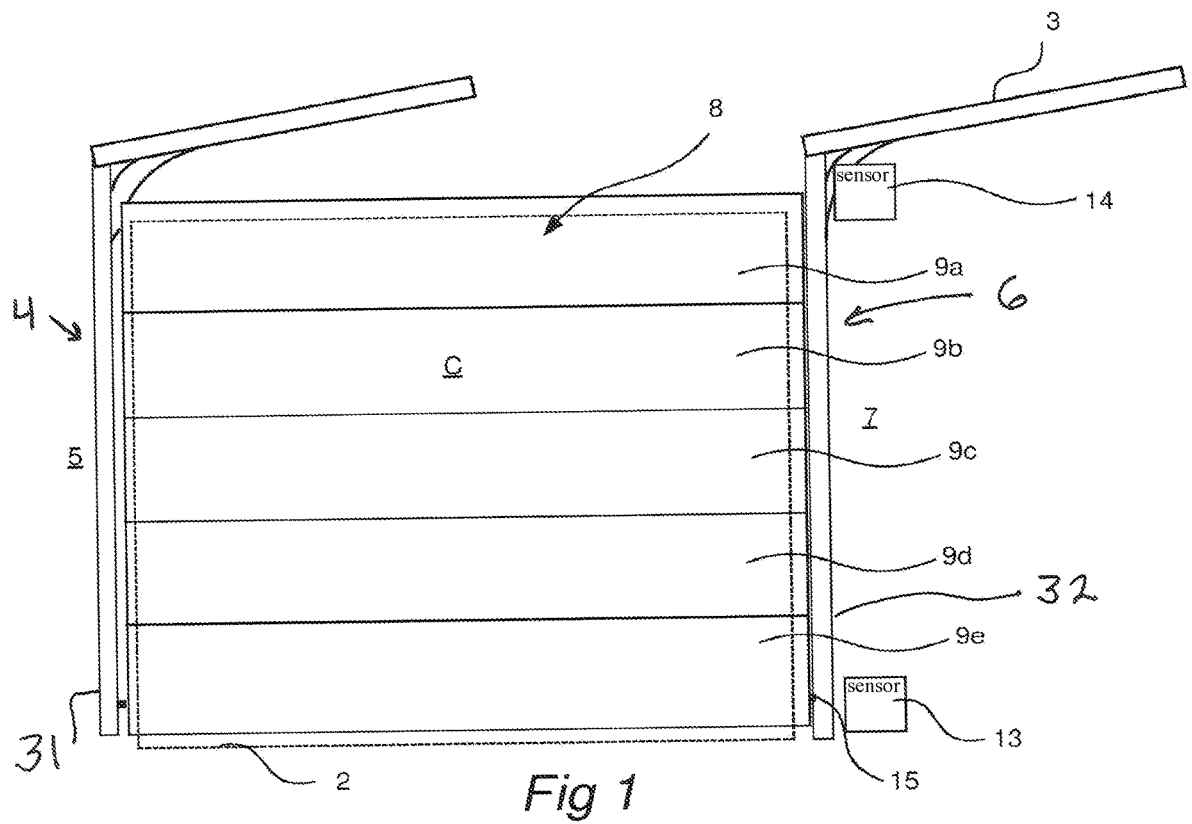
FIG. 1 is a schematic perspective view of a door operator system comprising a door in a closed position.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIGS. 1-4 and 11-13 all illustrate a sectional door operator system. However, as should be understood by a person skilled in the art, the inventive aspects of the present invention are also applicable to a door operator system that is a single blade door operator system.

Figure 2A:
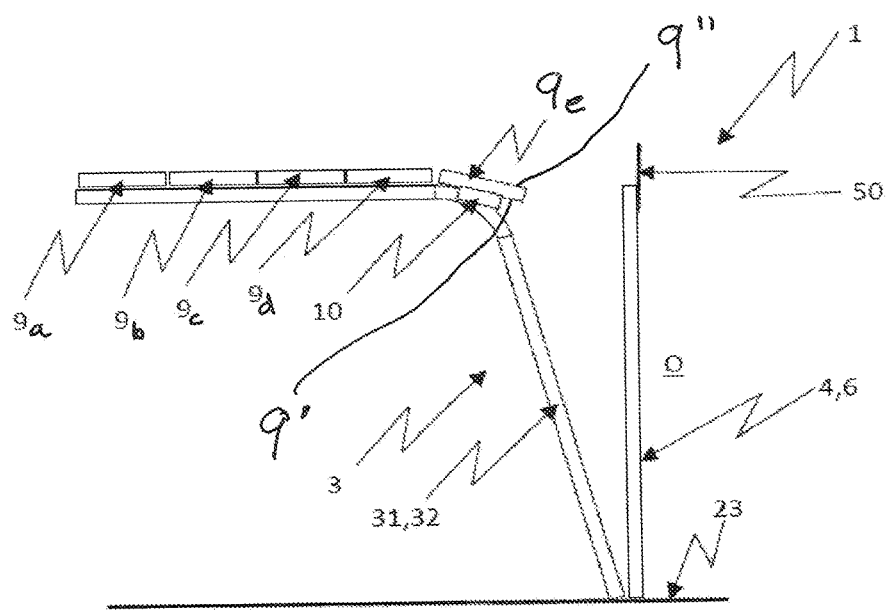
FIG. 2a is a schematic side view of a door operator system comprising a door in an open position.
Figure 2B:
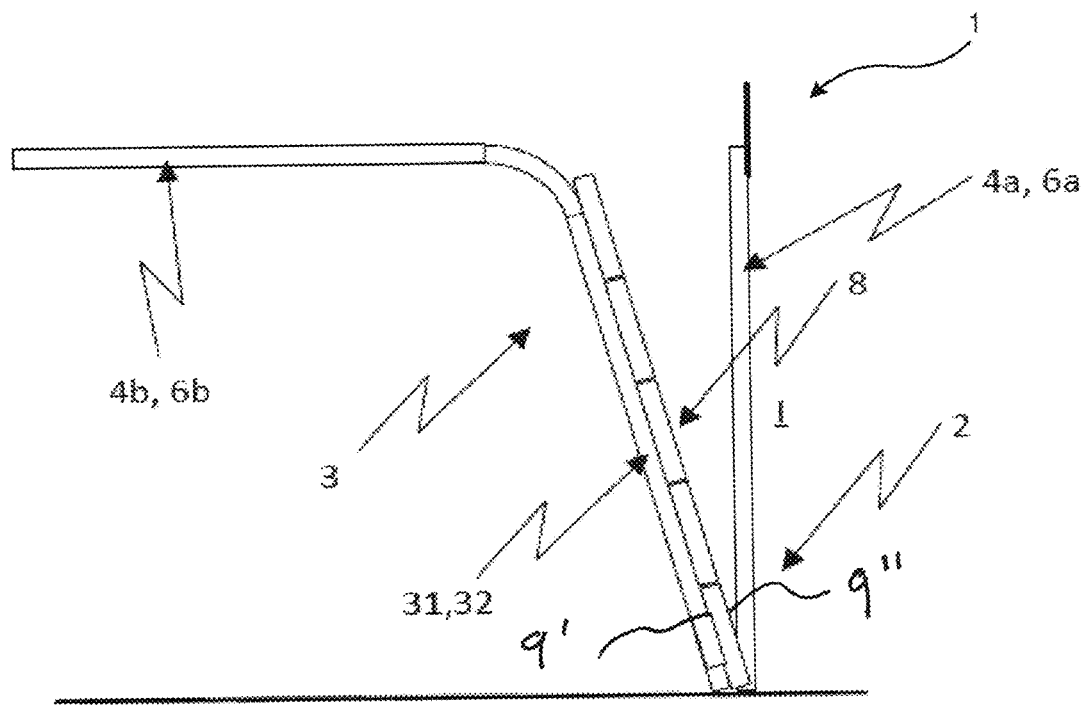
FIG. 2b is a schematic side view of a door operator system comprising a door in an intermediate position.
Figure 2C:
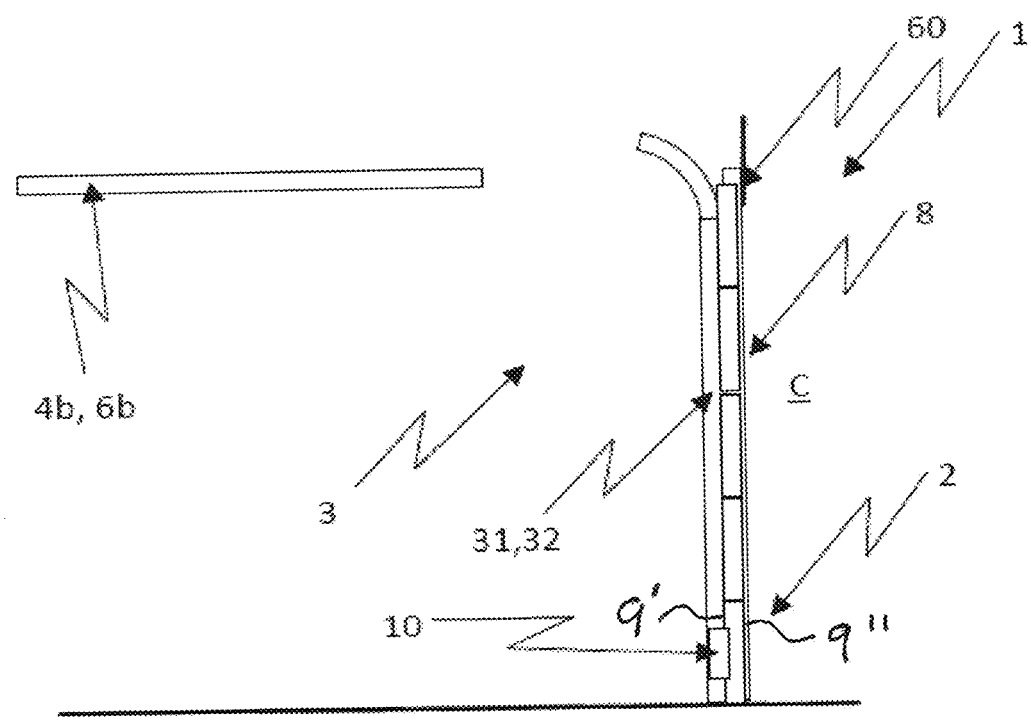
FIG. 2c is a schematic side view of a door operator system comprising a door in a closed position.

FIGS. 1-2 are schematic views of a door operator system 1 in which the inventive aspects of the present invention may be applied. The door operator system comprises a door frame 3, a drive unit 10 and a door 8. The door operator system 1 is arranged to be installed in an opening 2 defined by a wall 50 and a floor 23. The door 8 is connected to the door frame 3. The door operator system 1 is arranged to open and close the opening 2 by moving the door 8 between an open position O, as disclosed in FIG. 2a, and a closed position C, as disclosed in FIGS. 1 and 2c.

In this embodiment, the door 8 is a sectional door 8 comprising a plurality of horizontal and interconnected sections 9a-e connected to the door frame 3. In one embodiment, the door is a garage door. In an alternative embodiment, the door is an industrial door. The door 8 is arranged to be moved along the door frame 3 between the closed position C and the open position O.

The door operator system 1 further comprises at least one energy transmitting device 13, 14 which is disposed in close proximity to the door 8. As shown in FIG. 1, the door operator system 1 may comprise a first energy transmitting device 13 and a second energy transmitting device 14. The at least one energy transmitting device 13, 14 is configured to wirelessly transmit energy to energy receiving device (not shown in FIG. 1) mounted on the door 8.

In one embodiment, at least one energy transmitting device is disposed in close proximity to the vertical edge of the door 8. The at least one energy transmitting device may further be arranged to be disposed in close proximity to the vertical edge of the door 8 when the door 8 is in the closed position, open position and/or the between the open and closed position.

In one embodiment, the door operator system is an up and over door operator system. A up and over door operator system is a system in which the door in the closed position C is arranged substantially vertical and in the open position O is arranged substantially horizontal and inside of the opening.

In an alternative embodiment, the door operator system is an up and up door operator system. A up and up door operator system is a system in which the door in the closed position C is arranged substantially vertical and in the open position O is arranged substantially vertical above the opening.

In a further alternative embodiment, the door operator system may be a door operator system in which the door in the closed position C is arranged substantially vertical and in the open position O is arranged in an inclined position disposed between a substantially vertical and a substantially horizontal position. For example, the door may be arranged at a 45 degrees angle from a horizontal position in the open position O, as the skilled person recognizes however the door may be arranged at any angle disposed between the horizontal and vertical orientation of the door in the open position O.

The door frame 3 comprise a first frame section 4 at a first side 5 of the opening 2 and a second frame section 6 at a second side 7 of the opening 2. The door frame 3 is connected to the wall 50 and to the floor 23. In one embodiment, the first frame section 4 comprises a substantially vertical part 4a and a substantially horizontal part 4b. The second frame section 6 comprises a substantially vertical part 6a and a substantially horizontal part 6b. The vertical part 4a, 6a and the horizontal part 4b, 6b are connected to create a path for the door 8 to glide on and a track for the drive unit 10 to interact with. In one embodiment, wherein the door operator system is an up and up door operator system the first and second frame section are vertical.

Referencing FIG. 2a-c, in one embodiment the door frame 3 further comprise a first track unit 31 moveably connected to the first frame section 4, and a second track unit 32 moveably connected to the second frame section 6. The door 8 is connected to the first track unit 31 at said first side 5 and to the second track unit at said second side 7. In one embodiment, the first track unit 31 is moveably connected to the vertical part 4a of the first frame section 4 and the second track unit 32 is moveably connected to the vertical part 6a of the second frame section 6.

In one embodiment, the first and the second track unit 31, 32 are adapted to be angled in relation to the first and second frame sections 4, 6. In one embodiment, the first and the second track unit 31, 32 is adapted to be angled in relation to the vertical part 4a, 6a of the first and second frame sections 4, 6. The door 8 is moveable between the closed position C, as disclosed in FIG. 2b, an intermediate position I and the open position O.

In one embodiment, the first and the second track unit 31, 32 are adapted to be arranged in a first position in which the door 8 is in the closed position C and in a second position in which the door 8 is moveable between the intermediate position I and the open position O. The horizontal part 4b, 6b of the door frame 3 are in the second position connected to the first and second track unit 31, 32 to create a path for the door 8 to glide on and a track for the drive unit 10 to interact with the door frame 3. In the second position the door 8 is moveable along the door frame 3 and glides in the first and second track units 31, 32 and the first and second frame section 4, 6. In the second position, the first and second track units 31, 32 are connected to the parts of the first and second frame sections 4, 6 at which the door 8 is positioned in the opened position O. In the second position the first track unit 31 is connected with the horizontal part 4b of the first frame section 4 and the second track unit 32 is connected with the horizontal part 6b of the second frame section 6 to achieve a path for the door 8 to be moved along and the drive unit 10 to interact with.

In one embodiment, the door 8 is at a first side 5 moveably connected to the first track unit 31 and at a second side 7 moveably connected to the second track unit 32.

In one embodiment, the drive unit 10 is adapted to interact with the first and the second track unit 31, 32 to move the door 8 from the intermediate position I to the closed position C.

In one embodiment, the first and second track unit 31, 32 is adapted to interact with the door 8 to move the door 8 from the closed position C to the intermediate position I. In one embodiment the door 8 is moved by gravity from the closed position C to the intermediate position I.

In one embodiment, the first and the second track unit 31, 32 is angled in relation to the vertical parts of the first and second frame sections 4, 6 when moving the door 8 between the intermediate position I and the closed position C.

In one embodiment, the drive unit 10 moves the first and second track unit 31, 32 upwards to move the door 8 between the intermediate position I and the closed position C.

In one embodiment, the drive unit 10 and first and second track unit 31, 32 moves the door 8 towards the first and second frame section 4, 6 when moving the door 8 between the intermediate position I and the closed position C.

In one embodiment, the drive unit 10 and the first and second track unit 31, 32 press the door 8 towards the first and second frame section 4, 6 when the door 8 is in the closed position C.

In one embodiment, the first and second track units 31, 32 is in the first position arranged substantially parallel to the vertical parts 4a, 6a of the first and second frame sections 4, 6. In one embodiment, the first and second track units 31, 32 is in the second position at an angle in view of the first and second frame sections 4, 6.

Figure 5:
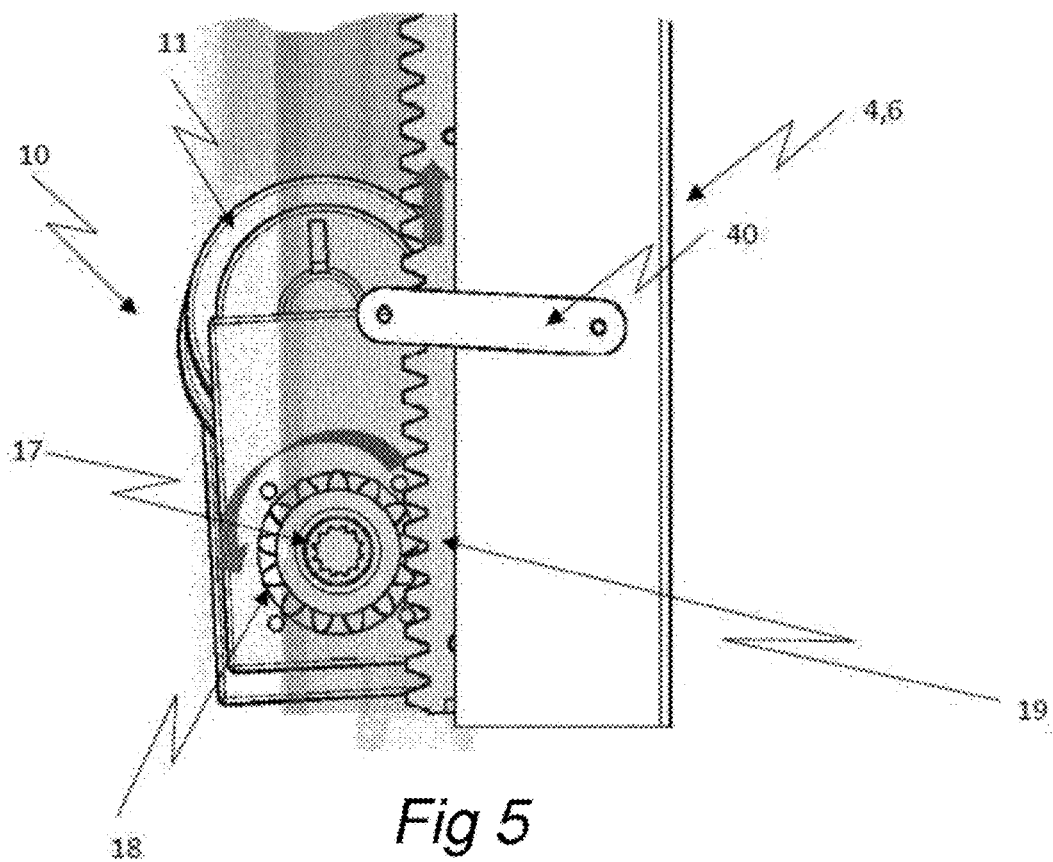
FIG. 5 is a schematic view of the connection between the door frame and the drive unit according to an embodiment.
Figure 6:
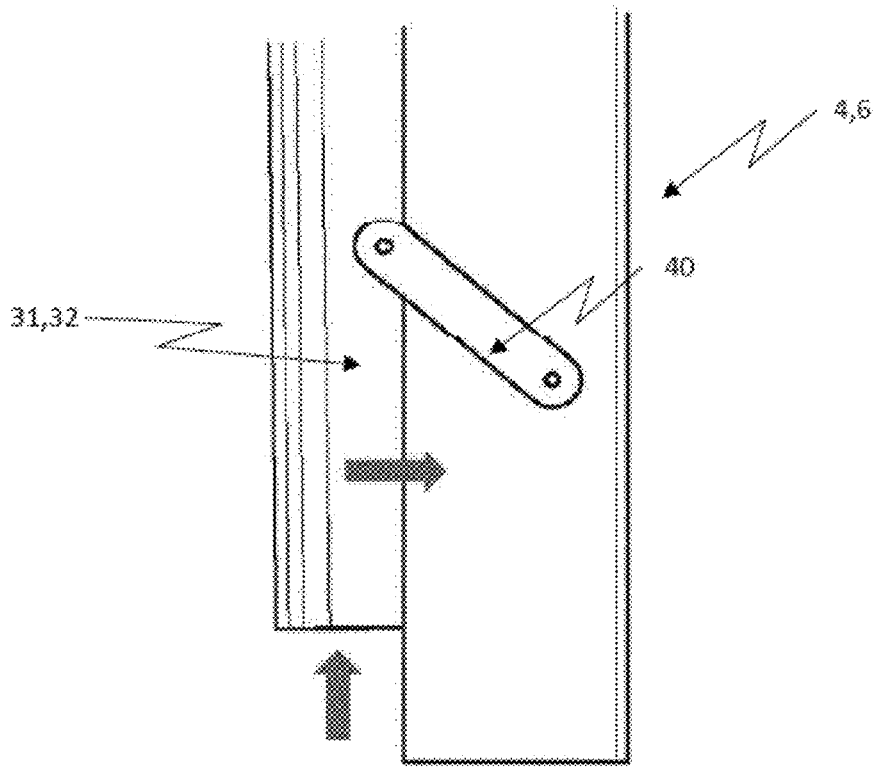
FIG. 6 is a schematic view of a part of the door frame generally according to an embodiment.

In one embodiment, the door frame 3 comprises at least two arms 40 as disclosed in FIGS. 5 and 6. One arm 40 is in a first end rotatable connected to the first frame section 4 and in an second end is rotatable connected to the first track unit 31 and one arm 40 in a first end is rotatable connected to the second frame section 6 and in an second end is rotatable connected to the second track unit 32. The at least two arms 40 are arranged to guide the first and the second track units 31, 32 when they are moved from the first position to the second position.

In one embodiment, the door 8 is at a first side 5 moveably connected to the first track unit 31 and at a second side 7 moveably connected to the second track unit 32.

In one embodiment, the first and second track unit 31, 32 comprise the guide track 16 in accordance with above. The guide track 16 is arranged to interact with the at least first respectively second wheel 17 of the drive unit 10.

In one embodiment, the door 8 is at a first side moveably connected to the first track unit 31 and at a second side moveably connected to the second track unit 32. In one embodiment one or more of the plurality of sections is connected to the first track unit 31 at said first side 5 and to the second track unit 32 at said second side 7.

Referencing FIGS. 1 and 2a-c, the door 8 is directly or indirectly connected to the door frame 3. The door 8 is at a first side moveably connected to the first frame section 4 and at a second side moveably connected to the second frame section 6. In one embodiment, one or more of the plurality of sections 9a-e is connected to the first frame section 4 at said first side 5 and to the second frame section 6 at said second side 7.

Figure 3:
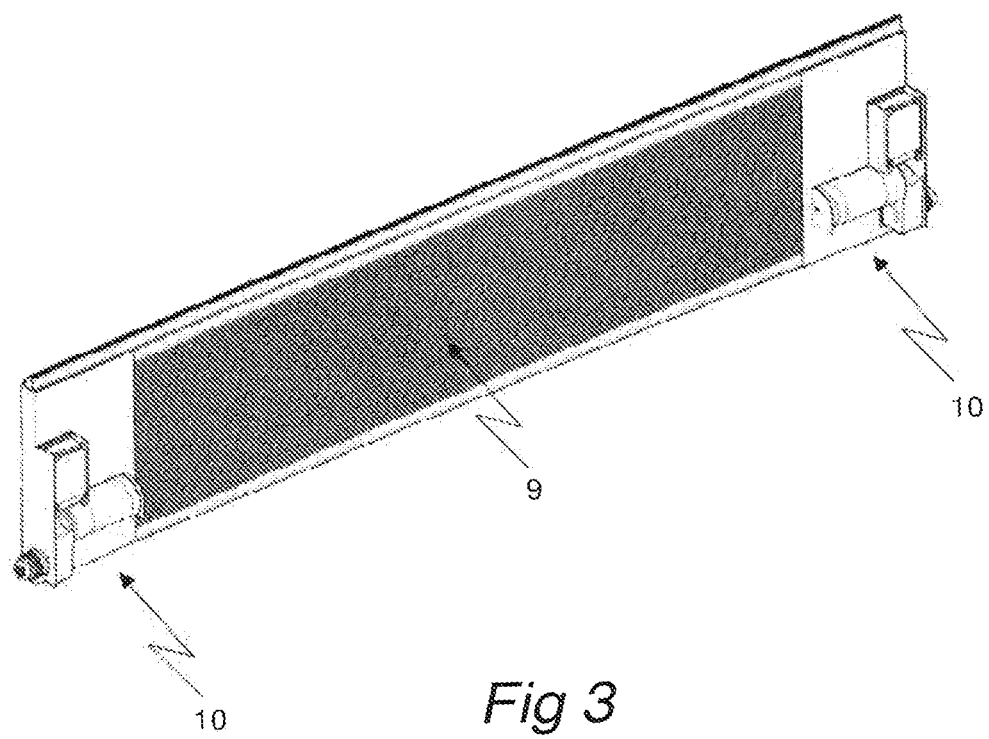
FIG. 3 is a schematic view of a section of a door and a drive unit generally according to an embodiment.
Figure 4:
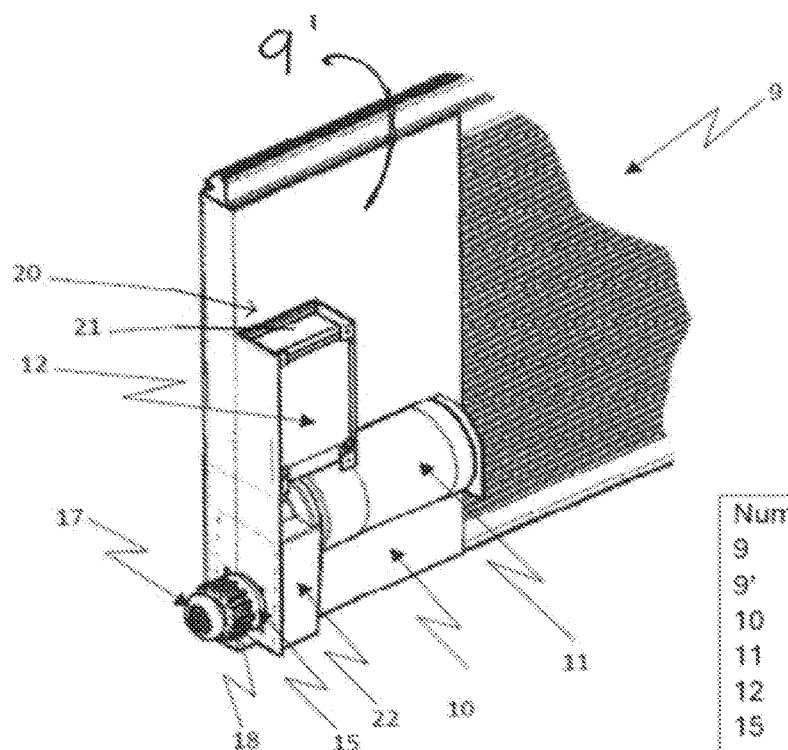
FIG. 4 is a schematic view of a part of the section of a door and the drive unit shown in FIG. 3.

With reference to FIG. 3-4, the drive unit 10 is mounted on the door 8. The drive unit 10 is moveably connected to the first and second frame section. Accordingly, drive unit 10 is connected so as to allow for relative movement between the door and the frame, whereby the drive unit is fix to the door. The drive unit 10 comprises at least one motor 11. The drive unit 10 is arranged to move the door 8 from the closed position to the open position. To provide power to the motor 11, the at least one motor 11 is connected to at least one energy storage device 12 arranged to power the at least one motor 11. The drive unit 10 is arranged to move the door 8 from the closed position C to the open position O.

In one embodiment, the drive unit 10 is arranged to move the door from the open position O to the closed position C. In one embodiment, the door 8 is arranged to move from the open position O to the closed position C by means of the weight of the door 8. In one embodiment, the drive unit 10 is arranged to brake the door 8 when moving from the open position O to the closed position C.

Further referencing FIG. 3-4, the drive unit 10 is further connected to the door frame 3. The drive unit 10 is at a first side moveably connected to the first frame section 4 and at a second side moveably connected to the second frame section 6. The first and second motor may be arranged on the same horizontal section of the door 8. The first and second motor may be arranged on the bottommost horizontal section 9e of the door 8.

In one embodiment, the drive unit 10 at least comprises a first motor 11a and a second motor 11b. The first motor 11a and the second motor 11b may be mounted at different vertical sides of the door 8.

In one embodiment, the drive unit 10 at least comprises a first motor 11a and a second motor 11b, the first motor 11a and the second motor 11b may be mounted at the same vertical sides of the door 8. The first and second motor may be arranged on the same horizontal section of the door 8. The first and second motor may be arranged on the bottommost horizontal section 9e of the door 8.

In one embodiment, the first motor 11a is moveably connected to the first frame section 4 and the second motor 11b is moveably connected to the second frame section 6. The drive unit 10 is arranged to interact with the door frame 3 to move the sectional door 8 from the closed position C to the open position O and from the open position O to the closed position C.

As depicted in FIG. 3-4, the motors 11 and the drive unit 10 are preferably arranged on the same main phase of the door 8, e.g. an outer or inner phase of the door 8. To protect the motors 11 and drive unit 10, said motors and drive unit are arranged on an inner phase of the door in the form of an interior facing door phase of the door 8.

In one embodiment, the drive unit 10 comprises a single motor 11. The motor 11 is connected to both the first frame section 4 and the second frame section 6. In one embodiment, the drive unit 10 may further comprise a shaft driven by said motor 11, the shaft connecting the motor 11 to said first and second frame section.

In one embodiment, the motor(s) 11 of the drive unit 10 is a direct current DC motor 11. In a preferred embodiment, the motor(s) 11 is a brushless direct current (BLDC) motor(s).

In one embodiment, the drive unit 10 comprise at least a first and second pinion 18, wherein the first pinion 18 is connected to the first motor 11a and the second pinion 18 is connected to the second motor 11b. The pinions 18 are rotated by the motors 11 when the motors 11 are running. The pinions 18 rotates the motors 11 when the weight of the door 8 moves the door 8.

In one embodiment, the drive unit 10 comprise at least a first and a second wheel 17. In one embodiment, the wheels 17 are connected to the motors 11a, 11b. In an alternative embodiment, the wheels 17 are connected to the pinions 18 of the drive unit 10. The wheels 17 may be arranged to be rotated by the motors 11.

As disclosed in FIGS. 5, 6, 7 and 8, the door frame 3 may comprise a rack 19. In one embodiment, the first and the second frame sections 4, 6 of the door frame comprise the rack 19. The rack 19 of the door frame 3 is arranged to interact with said at least first and second pinion 18 of the drive unit 3 to move the door 8. The connection between the drive unit 10 and the door frame 3 is not restricted to a rack and pinion 18 connection and could be achieved by means of one or more of a belt drive, a magnetic drive, chain drive or a friction drive. Both the first and the second frame section 4, 6 accordingly comprises the rack 18.

Figure 7:
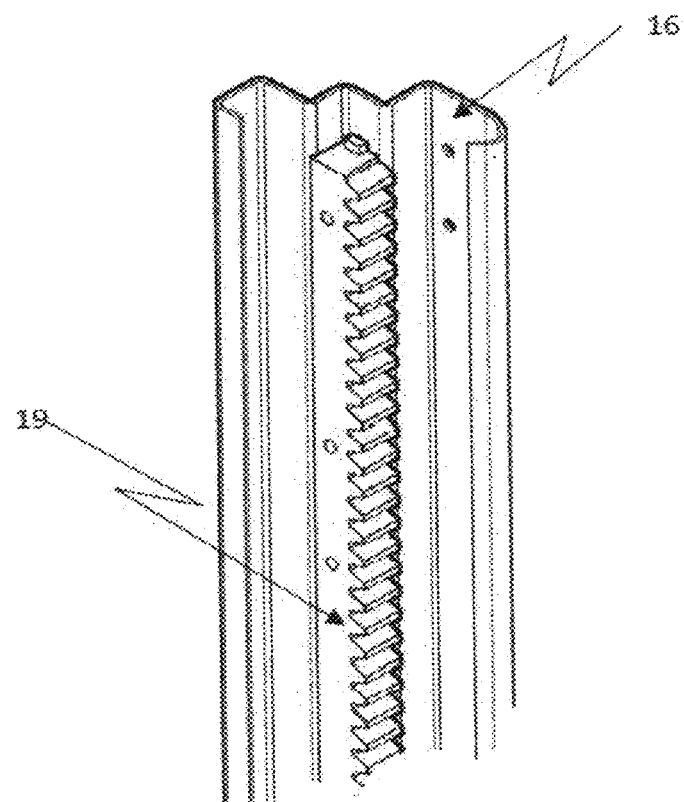
FIG. 7 is a schematic view of a part of the door frame generally according to an embodiment.
Figure 8:
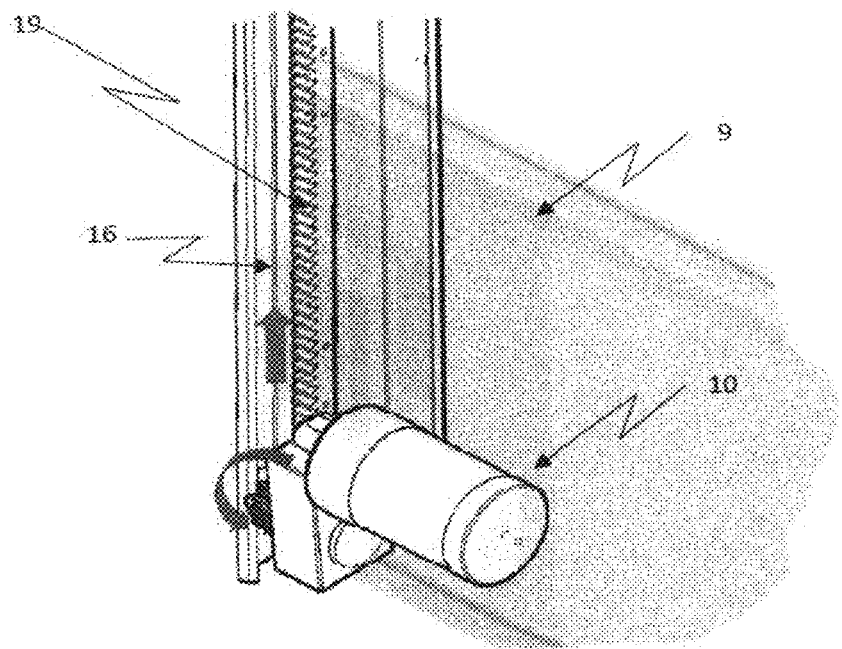
FIG. 8 is a schematic view the connection between the door frame and the drive unit generally according to an embodiment.

In one embodiment, as disclosed in FIG. 7, the door frame 3 comprises a guide track 16. In one embodiment, the guide track 16 is connected to the first and second frame section 4, 6. In an alternative embodiment, the guide track 16 is an integrated part of the first and second frame section 4, 6.

In one embodiment, the energy transmitting device is arranged in or integrated into the first and/or second track unit 31, 32 previously described with reference to FIG. 2a-c.

The wheels 17 are adapted to be inserted into the guide track 16. The wheels 17 are arranged to interact with the guide track 16 and to restrict horizontal movement of the wheels 17 when the wheels 17, and thus also the drive unit 10 and the door 8, is moved between the open and closed position O, C of the door 8.

Figure 9:
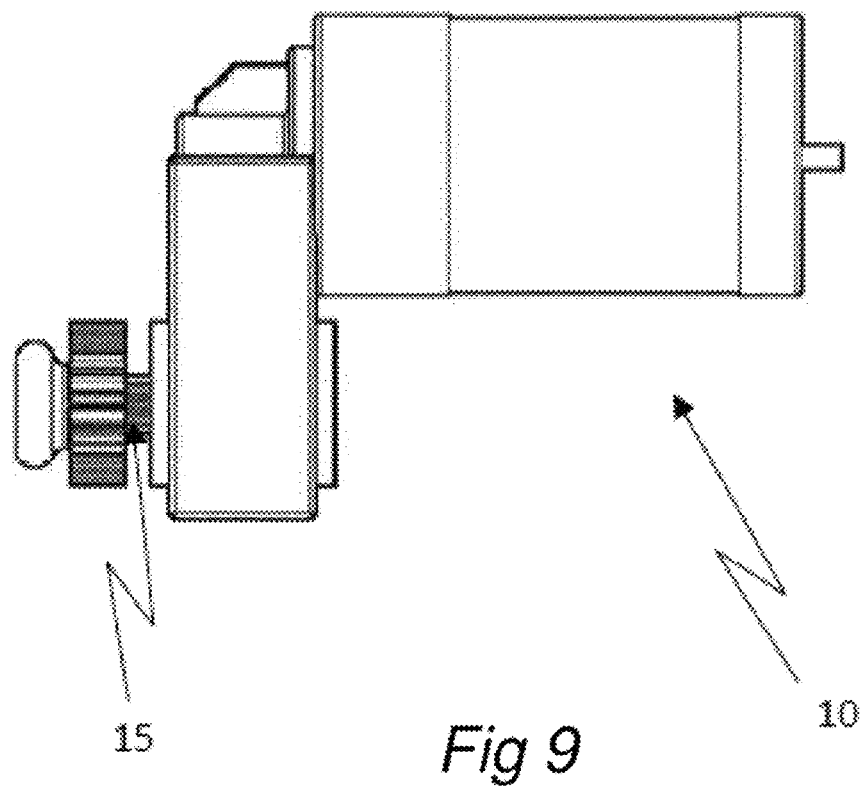
FIG. 9 is a schematic view of a drive unit comprising a spline joint in a compressed position.
Figure 10:
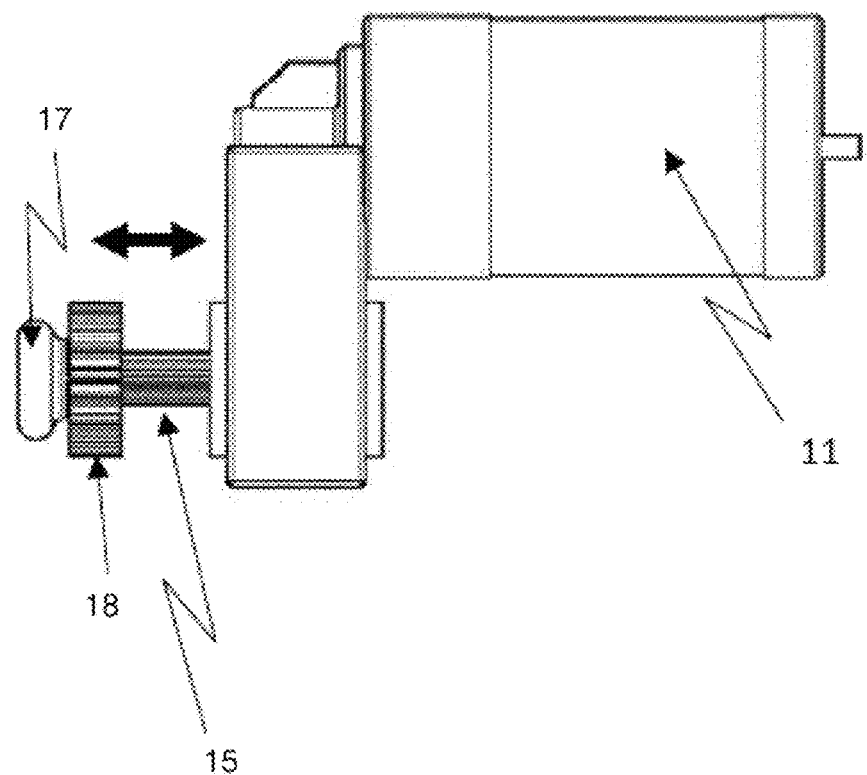
FIG. 10 is a schematic view of a drive unit comprising a spline joint in an extended position.

In one embodiment, as disclosed in FIGS. 9 and 10, the drive unit 10 comprise at least a first and a second spline joint 15. The first spline joint 15 is in one end connected to the first wheel 17 and in a second end connected to the first motor 11. The second spline joint 15 is in one end connected to the second wheel 17 and in a second end connected to the second motor 11. As the guide track 16 is arranged to restrict horizontal movement of the wheels 17 and the wheels are connected to the motors 11, the spline joints 15 will move and compensate for any horizontal movement of the drive unit 10 and the door 8 in relation to the door frame 3. The spline joints 15 will be compressed when the distance between the motors 11 and the door frame 3 decreases. The spline joints 15 will be extracted when the distance between the motors 11 and the door frame increases, as disclosed in FIG. 10.

In one embodiment, the spline joints 15 are arranged to compensate for horizontal movements of the first and second motor 11 in relation to the first and second frame section 4, 6, respectively. In one embodiment, the wheels 17 are connected to the spline joints 15 of the drive unit 10.

The spline joint arrangement is particularly advantageous in combination with the wireless energy transfer which will be described in further detail later on. This is due to the spline joint allowing a stable movement and a precise alignment between the door and the frame. Hence, a more efficient energy transfer is obtained due to the energy transmitting device(s) and energy receiving device(s) more reliably aligning.

In one embodiment, the drive unit 10 comprise one or more sensors (not shown) arranged to identify a person or object in the path of the door 8 and to interrupt or reverse the movement of the door 8 when identifying the person or object. The one or more sensors may be one or more of a pressure sensor, an IR-sensor, a camera, a radar or a presence sensor.

A control unit may be in operative communication with the drive unit 10. The control unit may be in wired communication with the two motors 11a, 11b or be in a wireless communication.

The control unit is configured to control the movement of the drive unit 10, i.e. when and how the drive unit 10, and its associated motors 11a, 11b, should move the door 8. The control unit is arranged to receive input of if the door 8 should be opened or closed. In one embodiment, the control unit is arranged to receive the input from one or more of a user interface, a mechanical button or a remote control.

Figure 11:
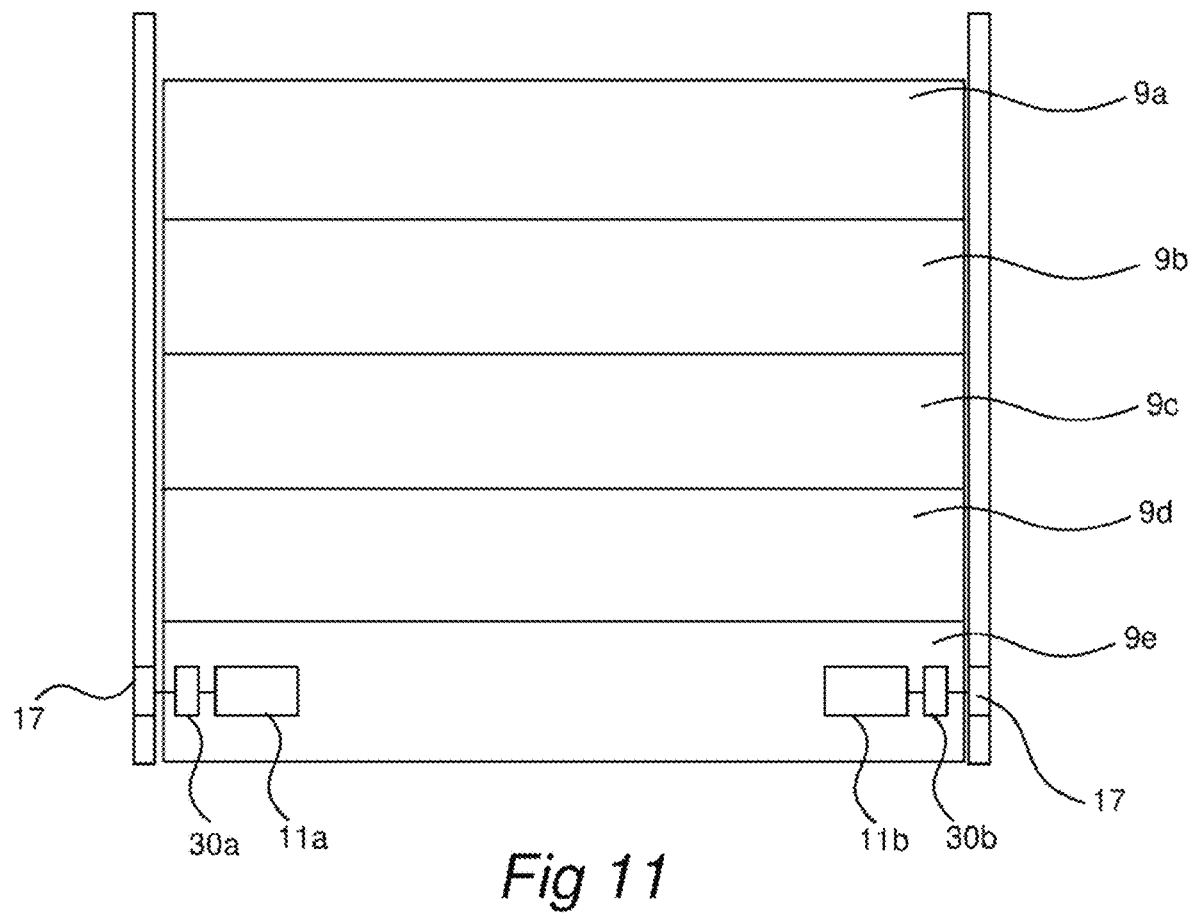
FIG. 11 is a schematic perspective view of a door operator system comprising a door in a closed position.

As depicted in FIG. 11, the drive unit 10 may comprise at least the first and the second motor 11 mounted on the first section 9e of the door 8. The first motor 11 is moveably connected to the first frame section 4 and the second motor 11 is moveably connected to the second frame section 6. In accordance with the aforementioned, the drive unit may further comprise additional motors which will now be described further.

Figure 12A:
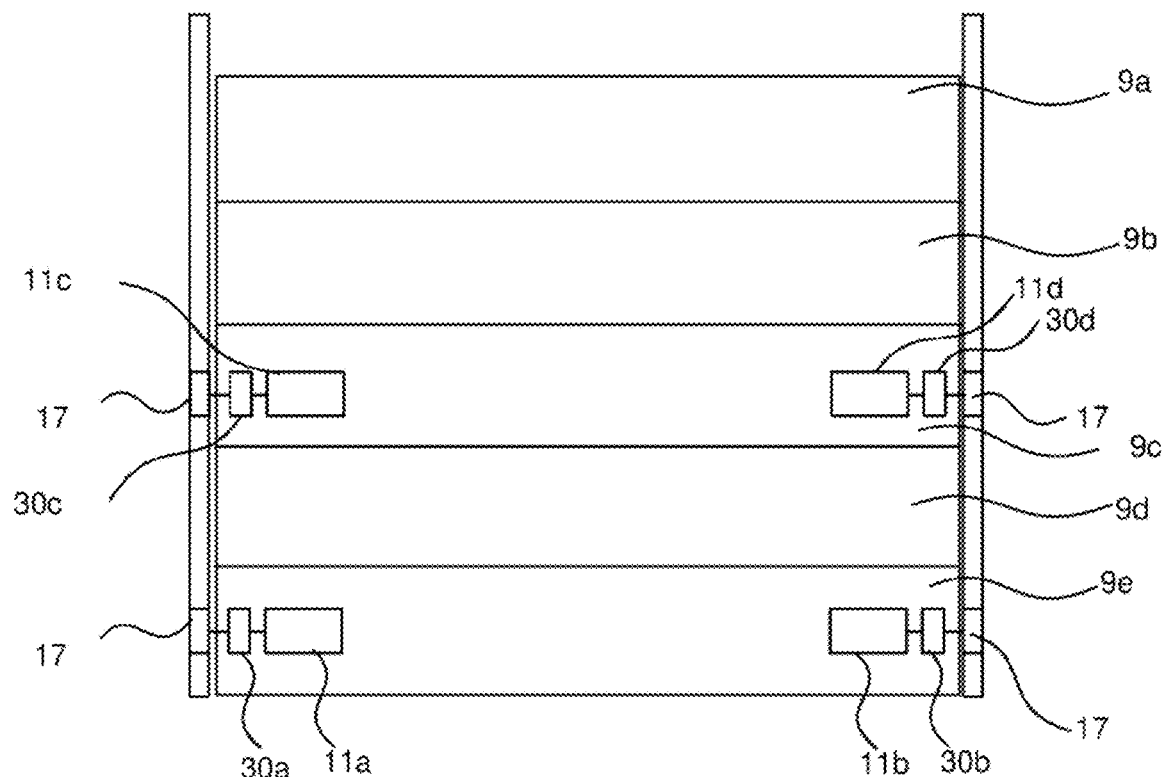
FIG. 12a is a schematic perspective view of a door operator system according to an embodiment, the door operator system comprising a door in a closed position.

In one embodiment schematically depicted in FIG. 12a, the drive unit 10 comprise a third and a fourth motor 11c-d mounted on a second horizontal section 9 of the horizontal sections and arranged to assist the first and second motors 11a-b when moving the sectional door 8 from the closed position C to the open position O. The third and fourth motors 11 are connected to the control unit 20 and arranged to be controlled by the control unit in the same way as described above in relation to the first and second motor 11. In one embodiment, the system 1 comprises four motors 11a-d and one control unit 20. The first and second motor 11a, 11b are arranged on one section 9e and the third and fourth motor 11c, 11d are arranged on another section 9c.

In one embodiment, the first and second motor 11a, 11b are arranged on a section 9e that is located on the section 9 of the door being closest to the floor 23 in the closed position C. However, it should be noted that the section 9e could for example also be the section 9d which is the section being arranged next to the section being closest to the floor 23 in the closed position C.

Figure 12B:
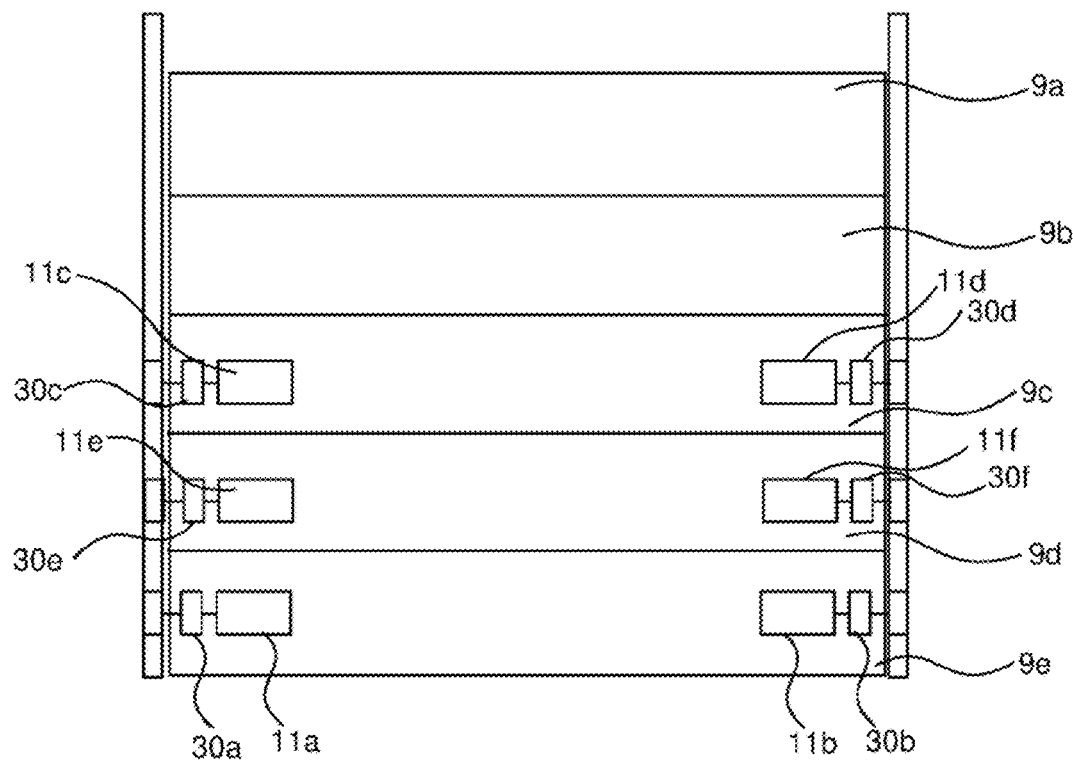
FIG. 12b is a schematic perspective view of a door operator system according to an embodiment, the door operator system comprising a door in a closed position.

In one embodiment schematically depicted in FIG. 12b, the drive unit 10 comprise a fifth and a sixth motor 11e-f mounted on a third horizontal section 9 of the horizontal sections 9 and arranged to assist the other motors 11 when moving the sectional door 8 from the closed position C to the open position O. The fifth and sixth motors 11e-f are connected to the control unit 20 and arranged to be controlled by the control unit in the same way as described above in relation to the first and second motor 11*a-b*. In one embodiment, the system 1 comprises six motors 11*a-f* and one control unit. The first and second motor 11*a*, 11*b* are arranged on one section 9*e*, the third and fourth motor 11*c*, 11*d* are arranged on another section 9*c*, and the fifth and sixth motor 11*e*, 11*f* are arranged on another section 9*d*.

In the embodiments where additional sections 9*a-e* are arranged with motors, these may be arranged on every other section, every section or at one section being arranged above the section 9*e*.

In one embodiment the first, second, third or the first, second, third and fourth motor may be arranged on a section 9. Preferably, said motors may be arranged on the bottommost section 9*e*.

Turning to FIGS. 13*a-d*, an energy receiving device 81 is mounted on the inner face 9' of the door 8. The energy transmitting device 13, 14 is configured to wirelessly transmit energy to the energy receiving device 81 mounted to said door 8. To allow for energy transfer between the door 8 and the energy transmitting device 13, 14, the energy receiving device 81 is operatively connected to the at least one energy storage device 12 for charging said energy storage device 12.

Hence, power is transmitted wirelessly between an external power source 96 to the drive units 10 mounted on the door 8. By means of the energy storage device 12 the motor is provided with enough power for moving the door 8. Thus, the energy transmitting device is configured to transmit energy to the energy receiving device 81 from an external power source 96.

Thereby a door operator system which enables driving of the door without hardware contact interfaces in the form of mechanical terminals. Compared to mechanical terminals which connects the energy transmitting device to the energy receiving device, the wireless connection is significantly less susceptible to contacting issues between said devices due to dirt, snow and corrosion. Accordingly, a door operator system which is more reliable is achieved.

Further, the wireless power transfer for driving the drive unit reduces the need for cables or wires extending between the door and components positioned next to the door, e.g. mounted to the frame or the wall. This reduces the complexity of the door operator system and the cost for assembling, installation and manufacturing of said door operator system. In addition, the reduced amount of moving parts in the system further increases the reliability of the door operator system.

Accordingly, the first energy transmitting device 13 and the second energy transmitting device 14 are configured to be connected to the external power source 96. The first and second energy transmitting device may be connected to a common power source or separate power sources. Phrased differently, the energy transmitting device(s) are arranged to wirelessly transmit, e.g. electrical energy, from the external power source to the energy receiving device 81 mounted to the door 8.

In one embodiment, the energy transmitting device 13, 14, e.g. any one of the energy transmitting device is mounted to the door frame. To simplify the design and construction of the door operator system both the energy transmitting devices 13, 14 may be mounted on the same side of the door opening 2. The energy transmitting devices 13, 14 may thus be mounted to the same frame section.

In one embodiment, the energy transmitting device(s) may be disposed adjacent to the vertical edge of the door 8, whereby the energy receiving device(s) are disposed on the door 8 close to the vertical edge of the door 8. The power transfer is thus made more reliable due to the small distance between the energy receiving and energy transmitting devices.

In one embodiment, the energy transmitting device(s) may be integrated into the door frame. The integration of the energy transmitting device(s) allows for easier installation and mounting of the door operator system and also provides logistical benefits due to simplifying the transportation of the components of the door operator system. For example, the energy transmitting device(s) may be disposed inside the guide track 16 so as to be at least partially covered by the walls of said guide track 16 or any of the frame sections so as to be at least partially covered by the walls of said frame section. The energy transmitting device is thus more protected against outside tampering and exposure to structural damage. Also, the energy transmitting device is concealed, whereby a more aesthetic door operator system is achieved.

Figure 13A:
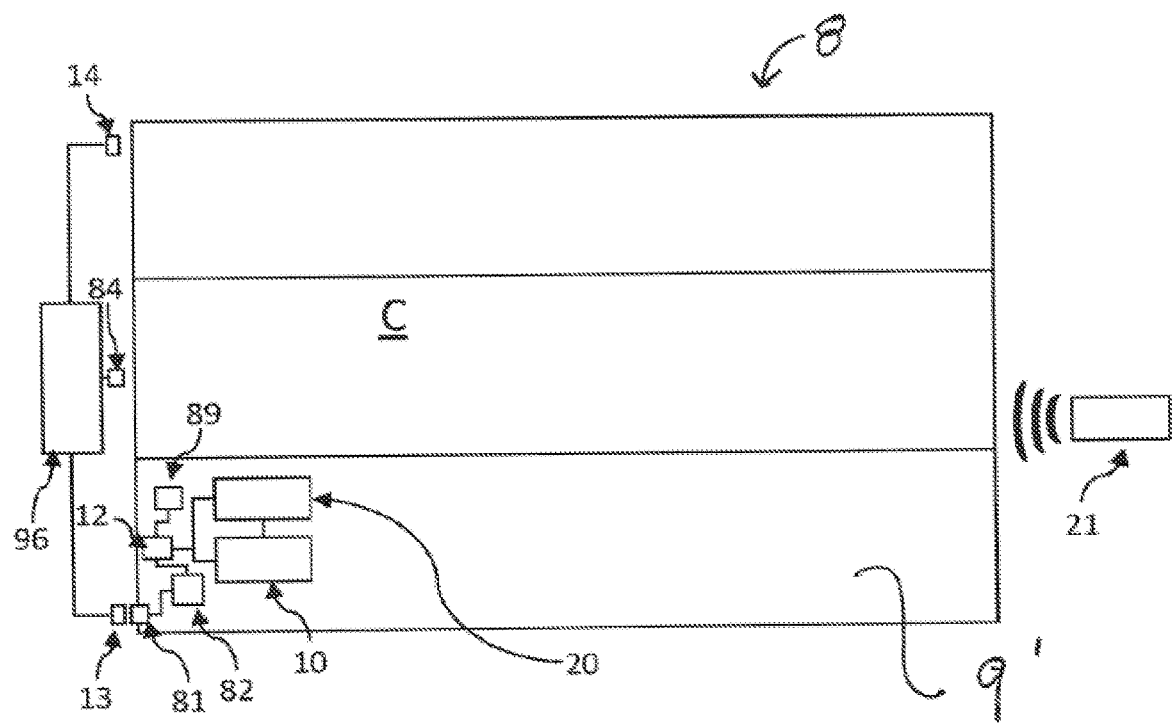
FIG. 13a is a schematic perspective view of a door operator system according to an embodiment, the door operator system comprising a door in a closed position.
Figure 13B:
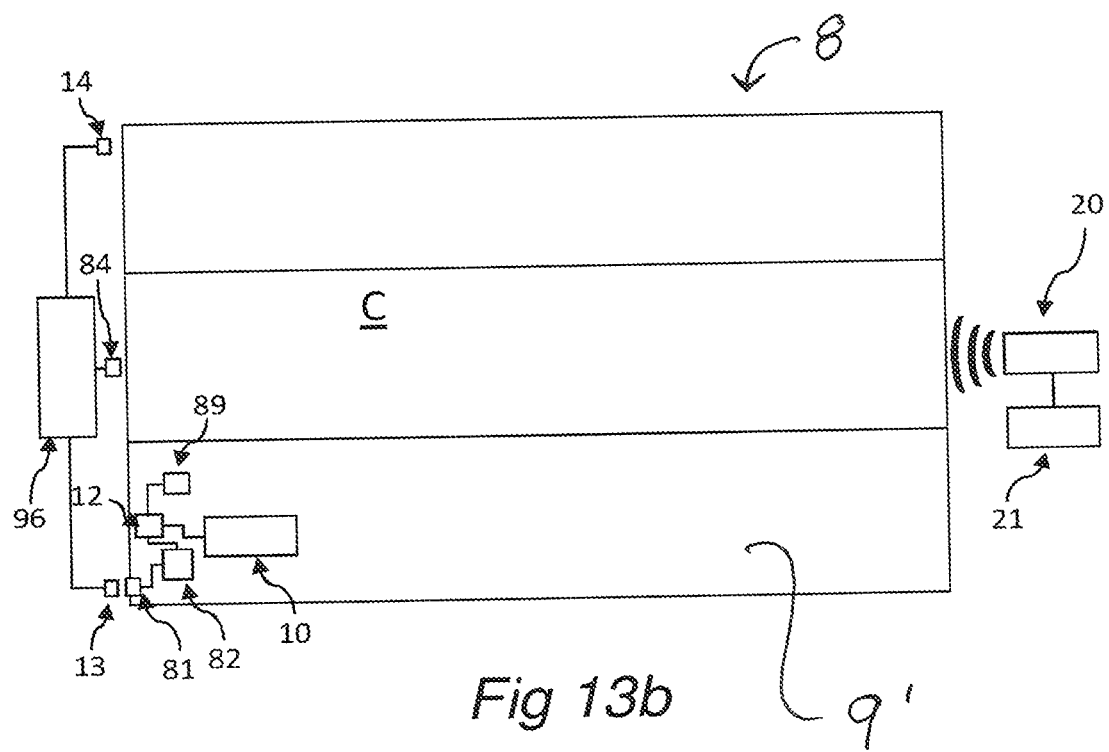
FIG. 13b is a schematic perspective view of a door operator system according to an embodiment, the door operator system comprising a door in a closed position.

FIGS. 13*a-b* discloses the door 8 of the door operator system 1 in the closed position C. The first energy transmitting device 13 is arranged to transfer energy to the energy receiving device 81 when the door 8 is in the closed position C. The first energy transmitting device 13 may thus be arranged to be aligned with the energy receiving device 81 when the door 8 is in the closed position. The first energy transmitting device 13 is disposed in close proximity to the door 8 so as to enable energy transfer between the energy receiving device 81 and the first energy transmitting device 13. Referencing said FIGS. 13*a-b*, the door 8 is moved to the closed position C whereby said energy receiving device 81 is aligned with the first energy transmitting device 13 and energy is transferred to the energy storage device 12 for charging the energy storage device 12. The drive unit 10 may thus be charged and provided with sufficient energy while being in the closed position C to enable a subsequent opening of the door 8. As a result, the door operator system may be optimised to be more energy-efficient, further the mounting of the energy transmitting device is easier to perform for the service and mounting personnel due to the closed position being a well-defined end position of the door.

Figure 13C:
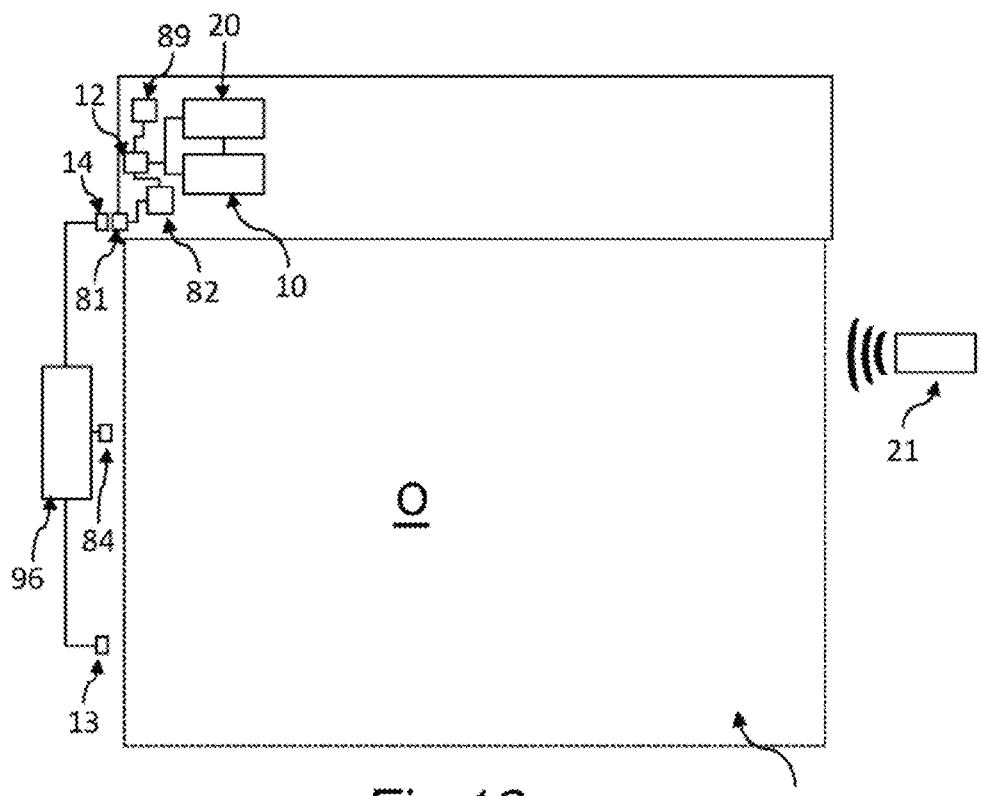
FIG. 13c is a schematic perspective view of a door operator system according to an embodiment, the door operator system comprising a door in an open position.
Figure 13D:
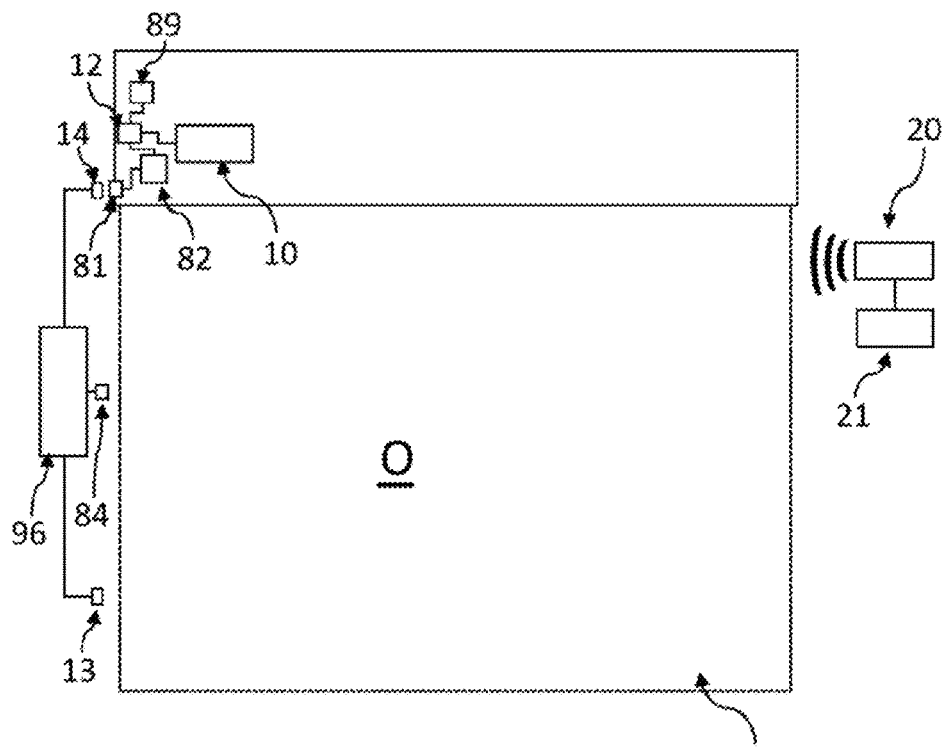
FIG. 13d is a schematic perspective view of a door operator system according to an embodiment, the door operator system comprising a door in an open position.

FIGS. 13*c-d* discloses the door 8 of the door operator system 1 in the open position O. The second energy transmitting device 14 is arranged to transfer energy to the energy receiving device 81 when the door 8 is in the open position O. The second energy transmitting device 14 may accordingly be arranged to be aligned with the energy receiving device 81 when the door 8 is in the closed position C. The second energy transmitting device 14 is disposed in close proximity to the door 8 so as to enable energy transfer between the energy receiving device 81 and the second energy transmitting device 14. Referencing said FIGS. 13*c-d*, the door 8 is moved to the open position O whereby said energy receiving device 81 is aligned with the second energy transmitting device 14 and energy is transferred to the energy storage device 12 for charging the energy storage device 12. Corresponding to the above example with the charging being performed in the closed position C of the door 8, the drive unit 10 may be charged and provided with sufficient energy while being in the open position O to enable a subsequent closing of the door 8, by means of selectively brake and drive the door 8. As a result, the door operator system may be optimised to be more energy-efficient, further the mounting of the energy transmitting device is easier to perform for the service and mounting personnel due to the open position being a well-defined end position of the door.

As depicted in FIGS. 13*a-d*, the same energy receiving device 81 may come into energy transmitting connection with both the first energy transmitting device 13 and the second energy transmitting device 14. Hence, the energy receiving device 81 may, due to it being mounted to the door 8, move between a position wherein it is aligned with the first energy transmitting device 13 when the door 8 is in the closed position C and a position wherein it is aligned with the second energy transmitting device 14 when the door is in the open position O. By only utilising a single energy receiving device for energy transfer from the first and second energy transmitting device, the complexity of the door operator system is reduced and less cables has to be utilised on the door.

In one embodiment, the door operator system may comprise a plurality of energy receiving devices 81 each of which may be disposed to align with any number of energy transmitting devices 13, 14.

Notably, the energy transmitting device(s) and energy receiving device(s) are configured to enable energy transfer between them upon alignment. In one embodiment, the energy transmitting device(s) and energy receiving device(s) may thus be paired independently as the energy receiving device(s) moves corresponding to the movement of the door 8.

In one embodiment, one energy transmitting device 84 which may be a third energy transmitting device 84 may be arranged to transfer energy to the energy receiving device 81 when the door is in an intermediate position between the closed position C and the open position. Accordingly, the energy transmitting device 84 may be arranged to transfer energy to the energy receiving device 81 when the door 8 is kept at an intermediate position. The intermediate position is a position disposed along the movement trajectory of the door between the closed position and open position. The intermediate position may correspond to a predefined intermediate position such as a ventilating position or a partially open positon of the door 8.

Figure 14A:
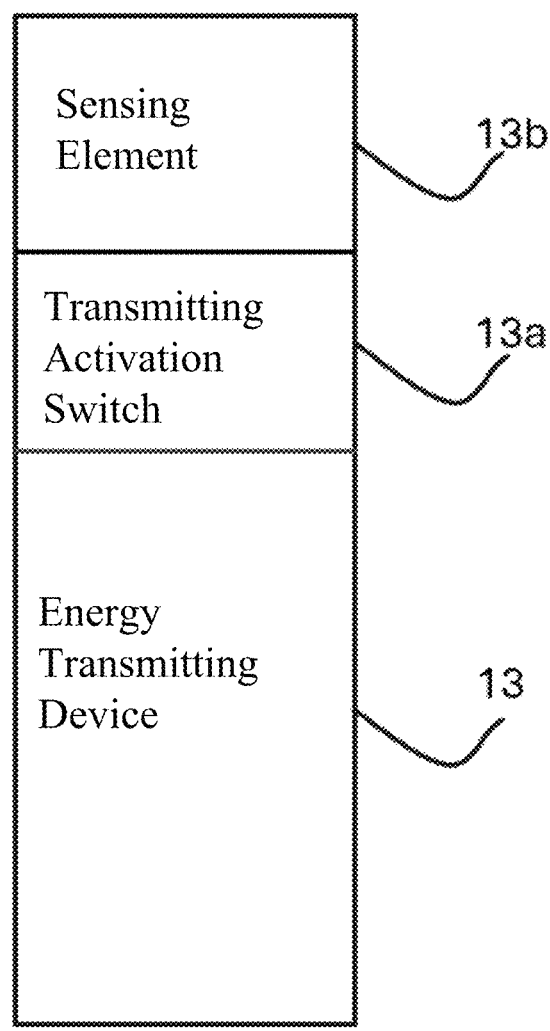
FIG. 14a shows an energy transmitting device according to an embodiment of the disclosure.

In one embodiment shown in FIG. 14*a*, the energy transmitting device(s) 13 may comprise a transmitting activation switch 13*a* and a sensing element 13*b*. The sensing element 13*b* is configured to detect when the energy receiving device 81 is in within a distance allowing for energy transfer, whereby said switch 13*a* is configured to in response to the sensing element 13*b* detecting the energy receiving device being within the distance allowing for energy transfer activate the energy transmitting device to allow for energy transmission between the energy transmission device and the energy receiving device.

Figure 14B:
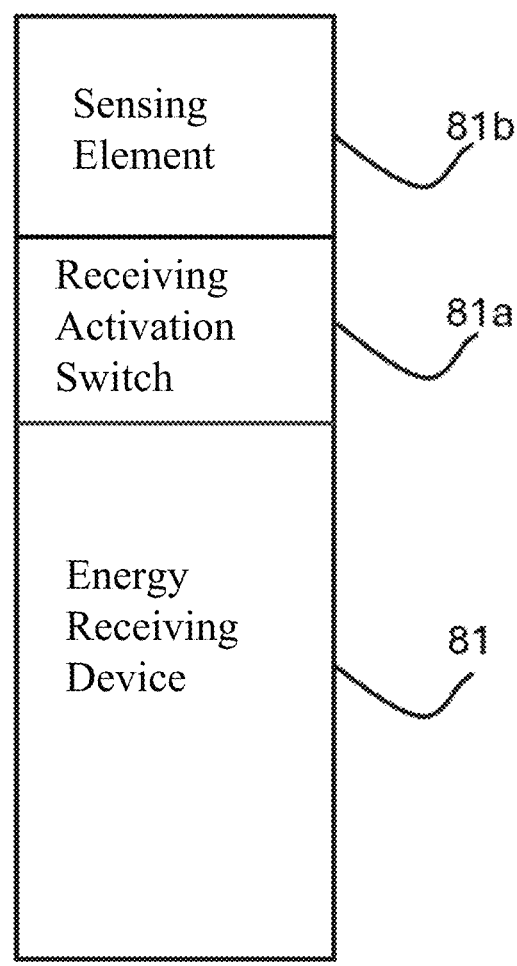
FIG. 14b shows an energy receiving device according to an embodiment of the disclosure.

In one embodiment shown in FIG. 14*b*, the energy receiving device(s) 81 may comprise a receiving activation switch 81*a* and a sensing element 81*b*. The sensing element 81*b* is configured to detect when the energy transmitting device 13 is in within a distance allowing for energy transfer, whereby said switch 81*a* is configured to in response to the sensing element 81*b* detecting the energy transmitting device 13 being within the distance allowing for energy transfer activate the energy receiving device 81 to allow for energy transmission between the energy transmitting device 13 and the energy receiving device 81.

In one embodiment, the energy receiving device(s) and/or energy transmitting device(s) may be operatively connected to an energy transmission controller, the energy transmission controller may be comprised in the energy transmitting device, the energy receiving device or the control unit Said energy transmission controller may be configured to control the effect of the energy transmitting device. In one embodiment, said energy transmission controller may be configured to control the effect, e.g. the effect of the induction signal emitted from the energy transferring device, of the energy transmitting device based on the distance between the energy transmitting device and the corresponding energy receiving device.

By means of the selective activation of the energy transfer, the energy receiving device and/or the energy transmitting device does not have to be in an active mode until said devices are close enough to each other to allow for energy transfer. Hence, the selective activation of the energy transfer upon alignment of the energy receiving device and energy transmitting device enable a reduction of the overall energy consumption of the door operator system.

As previously described, the door operator system may further comprise the control unit 20. The control unit 20 is in operative communication with the drive unit 10 and configured to control the operation of the drive unit 10. Further, the control unit 20 may be configured to control the movement of the drive unit 10, i.e. when and how the drive unit 10, and its associated motors, should move the door 8. The control unit 20 is arranged to receive input of if the door 8 should be opened or closed. In one embodiment, the control unit 20 is arranged to receive the input from one or more of a user interface, a mechanical button or a remote control. As will be described more with reference to FIG. 13*a-d*, the control unit 20 is configured to control the operation of the at least first and second motors 11*a*, 11*b* or the single motor 11. In a preferred embodiment, the control unit 20 is configured to control and adjust the operating speed of one or all of the motors in response to position data.

As schematically depicted in FIGS. 13*a* and 13*c*, the control unit 20 may be mounted to the door 8 and may be connected to the energy storage device 12 for receiving energy from said energy storage device 12. The control unit 20 may be connected to the energy storage device 12 for powering said control unit 20. The control unit 20 may be connected to the energy storage device 12 by means of a wired connection.

Hence, the components associated with the movement of the door may all be disposed on the door which may completely remove any need for wires and cables extending between the surroundings and the door.

In one embodiment, at least one additional energy consuming device 89 may be arranged on the door 8. Said energy consuming device 89 may be connected to the drive unit, e.g. the energy storage device 12 of the drive unit 10, for receiving energy therefrom. The energy consuming device 89 may for example be a display, light source or sensor such as a wireless sensor. Said energy consuming device may be operatively connected to the control unit 20, whereby the control unit 20 is further configured to control said energy consuming device.

In one embodiment, the door operator system further comprises an operator panel 21 for sending operator input to the control unit 20 of the drive unit 10. The operator panel 21 may comprise a user interface for manual control of the door 8. The operator panel 21 may comprise a set of buttons or a touch screen for allowing said control of the door 8. The operator panel 21 may be mounted externally from the door 8. As depicted in FIGS. 13*a* and 13*c* the operator panel 21 may be configured to wirelessly communicate with the control unit 20 arranged on the door 8

As schematically depicted in FIGS. 13*b* and 13*d*, the control unit 20 is mounted externally from the door 8 and is configured to communicate wirelessly with the drive unit 10, e.g. mounted away from the door 8. Hence the drive unit 10 may further comprise a communication interface connected to the energy storage device 12 for receiving energy from said energy storage device 12. The communication interface is operatively connected to the at least one motor 11 of the drive unit 10 and is further configured to receive control signals wirelessly from the control unit 20 and transfer said control signals to the at least one motor 11 for controlling said motor 11. Hence, no cables or wires are required for transferring control input to the drive unit, e.g. the at least one motor of the drive unit. Further referencing said FIGS. 13*b* and 13*d*, the operator panel 21 may be connected to the control unit 20 by means of a wired connection. In one embodiment, the operator panel 21 may be integrated into the control unit 20.

The energy storage device 12 may be any conventional and suitable energy storage device 12 known to the skilled person. The energy storage device 12 is configured to receive energy from the energy receiving device 81 and store said energy. Further, the energy storage device 12 is configured to release said energy to operate the at least one motor of the drive unit 10.

In one embodiment, the energy storage device 12 is a battery, whereby the energy receiving device 81 is connected to the battery 12 via a battery charger 82 mounted to the door 8, the battery charger 82 being configured to charge said battery 8. The energy receiving device 81 is connected to the battery charger 82 and the battery 8 by means of a wired connection. The voltage of the battery is preferably relatively low. In one embodiment, the voltage of the battery may be between 12 V and 60 V. Preferably, the voltage of the battery may be 36 V or 24 V or 48 V. If the voltage is lower than 42.2 V, the electrical system of the door may be classified as a Safe Extra Low Voltage (SELV) system. This relieves the design from many costly and complicated design issues, and simplifies the certification and approval process to a great extent. To achieve this classification, the power supply from the mains must have an electrical insulation between the primary and secondary side equivalent to double insulation or reinforced insulation (according to EN 60 335-1). Hence, in one embodiment, the voltage of the battery may not exceed 42.2 V.

In one embodiment, control unit 20 is operatively connected to the battery charger 82 and further configured to control said battery charger 82 for controlling the charging of the battery 12.

In one embodiment, the energy storage device 12 may be a capacitor, such as a super capacitor. The capacitor is mounted to the door 8 and connected to the drive unit 10, e.g. the at least one motor 11 of the drive unit 10.

In one embodiment, wherein the energy transmitting device 13, 14 and the energy receiving device 81 are arranged to be in an energy transferring relation, e.g. aligned, without coming into contact, e.g. physical contact. Thus, the energy transmitting device(s) are configured to transmit energy to the energy receiving device(s) without coming into contact with the energy receiving device(s). As depicted in FIG. 13*a*-13*d*, the energy transmitting device(s) and energy receiving device(s) are arranged to be disposed at a distance from each other while being in energy transferring relation. Preferably, the distance is between 3 and 20 mm, and even more preferably between 5 and 10 mm.

In one embodiment, the energy transmitting device 13, 14 is a transmitting coil and the energy receiving device 81 is a receiving coil, whereby the receiving coil receives energy wirelessly by means of induction.

In one embodiment, the receiving coil and the transmitting coil are at least partially encapsulated by an electrically insulating material. Thereby, the induction-based energy transmission is achieved while the coils are insulated in case of electrical defects or faults. Due to the energy transmitting circuits being insulated from the exterior, no additional components, such as isolation transformers are required to achieve a safer door operator system. The electrically insulated material may be a plastic material, such as PEEK thermoplastic, polypropylene, PVC etc. The electrically insulating material at least partially encapsulating the receiving coil and the transmitting coil may hence be arranged to extend between said coils so as to create an electrically insulating interface when the receiving and transmitting device are in energy transferring relation.

An opening and closing cycle of the door operator is hereby exemplified. In the closed position C the door 8 is positioned in the opening 2 and the opening is closed and the first energy transmitting device 13 charges the one or more batteries 12 of the drive unit 10. When the control unit 20 receives input of that the door 8 should be moved from the closed position C to the open position O, the control unit 20 controls the drive unit 10 to start. The input could be from a remote control or by pressing an activation button of the door operator system 1. The energy storage device 12 powers the drive unit 10 to drive the at least one motor 11 that are mounted to the door 8 and connected to the door frame 3. The at least one motor 11 rotates the pinions 18. The pinions 18 rotates and interacts with the rack 19 and the drive unit 10 and the door 8 is moved upwards, see arrows in FIG. 10. As the drive unit 10 moves the door 8 upwards, the door 8 moves in the first and second frame section 4, 6. The first and second frame section 4, 6 guides the movement of the door 8 to guide the door 8 from the closed position C to the open position O. In the open position 8, the energy receiving device 81 is aligned with the second energy transmitting device 14, whereby energy transfer is enabled between said energy receiving device 81 and the second energy transmitting device 14 which allows for charging of the energy storage device 12.

In one embodiment, the energy transmitting device 13, 14 and the energy receiving device 81 are arranged to be in an energy transferring relation by means of coming into contact during movement of the door 8. The energy transmitting between the energy transmitting device and the energy receiving device is achieved when the door 8 is between the open and closed position. The energy transmitting device is thus able to provide energy to the energy storage device 12 during the movement of the door 8 by means of a conductive contact between the transmitting device and the receiving device.

One of the energy transmitting device or the energy receiving device may be a conductive guiding element and the other of the energy transmitting device or the energy receiving device may be a conductive guide element for interfacing with the conductive guiding element. In one embodiment, the conductive guiding element is a conductive rail, for example a gliding rail, whereby the guided element is configured to move along the conductive rail.

In one embodiment, the guide track 16 is a conductive guiding rail connected to the external power source 96. The wheels 17 may be adapted to be inserted into said guide track 16 may thus be conductive elements. As an alternative, conductive guide elements in form of sliding elements mounted to the door 8 may be arranged to be inserted into the guide track 16 to be in contact with said guide track. The energy storage device 12 may thus be charged continuously during the movement of the door 8 further allowing the motor to be provided with sufficient power to move the door from the closed position C to the open position O.

In one embodiment, at least one motor 11 of the drive unit 10 is configured to brake the movement of the door 8 when the door 8 is moved from the open position O to the closed position C. In one embodiment in which the operator system has two motors, both the first and second motor 11a and 11b are configured to brake the movement of the door 8 when the door 8 is moved from the open position O to the closed position C.

In one embodiment, at least one motor 11 of the drive unit 10 is configured to act as a generator and to charge the at least one energy storage device 12 when the door 8 is moved from the open position O to the closed position C. In one embodiment, both the first and second motor 11a, 11b of the drive unit 10 is configured to act as a generator and to charge the at least one energy storage device 12 when the door 8 is moved from the open position O to the closed position C. Due to the weight of the door 8 forcing the door towards the closed position, the at least one motor of the drive unit is caused to rotate, whereby the motor may generate power for charging said energy storage device 12. Thus, power may be provided to the at least one motor even during frequent opening and closing of the door whereby the door 8 may not reach an open and closed position for extended periods of time. Hence, the energy storage device 12 is charged in a more reliable manner.

At least one motor 11 of the drive unit 10 may further comprise a brake. In one embodiment, both the first 11a and the second motor 11b comprises the brake. In one embodiment, the brake is an electromagnetic brake. The brake is arranged to control/reduce the speed of the door 8 when it is moved from the open position O to the closed position C. In one embodiment, the brake is arranged to keep the door from moving in any position along the trajectory of door between the closed position and open position. Hence the brake may be arranged such that the door is prevented from moving by means of the brake when the power to the motor is cut-off, e.g. when the energy storage device does not provide any energy, e.g. power, to the motor.

Referencing FIG. 12-13, the door operator system may comprise one or more motors. In one embodiment, the drive unit 10 may comprise at least a first motor 11a and a second motor 11b. The drive unit 10 may further comprises at least one energy storage device 12. The at least one energy storage device 12 arranged to power at least one of the motors 11a, 11b is at least connected to one of the first or second motor 11a, 11b. In one embodiment, the at least two motors 11a, 11b are connected to one energy storage device 12. In an alternative embodiment, one or more energy storage devices 12 are connected to each motor 11a, 11b. In yet one embodiment, the first motor 11a is connected to a first energy storage device and the second motor 11b is connected to a second energy storage device. The drive unit 10 is mounted to the door 8.

In one embodiment, as depicted in FIG. 11, the drive unit 10 is mounted to a section 9e, i.e. one of said plurality of horizontal and interconnected sections, of the door 8. The first motor 11a and the second motor 11b are arranged on the same section 9e. Preferably, the first motor 11a and the second motor 11b are arranged at different vertical sides of the section 9e. Each motor 11a, 11b is thus arranged in conjunction to the first frame section 4 and the second frame section 6, respectively.

In one embodiment, the door 8 could be horizontal, or at least at an angle in view of the closed position C, and the door 8 is positioned inside of the opening 2 and above the opening 2. When moving from the closed position C to the open position O, the sections 9 of the door that are interconnected will push on each other such that the whole door 8 will move upwards. The sections 9 will rotate and move in relation to each other when moving from a vertical position to the horizontal position.

The control unit 10 will control the drive unit 10 to stop when the door 8 is positioned in the open position O. In the open position O the one or more energy storage device 12 is connected to the second energy transmitting device 14 and the second transmitting device 14 charges the one or more energy storage device 12.

In the open position O the drive unit 10 brakes the door 8 to restrict any movement of the door 8. In one embodiment, this is achieved by the motor(s) 11 acting as a generator 11 during the deceleration of the door prior to the halting of the door 8 to restrict movement between the pinions 18 and rack 19 and/or the brake(s) 22 is activated. The control unit 10 thereafter receives input, either as a signal or after a predetermined time after opening, of that the door 8 should be moved to the closed position C. The brake(s) 22 is released and/or the energy storage device 12 drives the at least first and second motor 11 to start moving the door 8.

In one embodiment, the sectional door operator system uses the gravity acting on the door 8 to move the door 8 from the open position O towards the closed position C. The sections 9 of the door 8 glide in the first and second frame section 4, 6 of the door frame 3. The rack 19 interacts with the pinions 18 and rotates the pinions 18 as the door 8 and the drive unit 10 is moved downwards.

In one embodiment, at least one of the first and second motor 11 is run as a generator 11 when moving the door 8 from the open position O to the closed position C. As the pinion(s) 18 are rotated the motor 11 is rotated. The motor 11 reduces the speed of the door 8. The motor 11 that is connected to the one or more energy storage device 12 charges the one or more energy storage device when moved by the pinion 18 and rack 19 interactions. By using the kinetic energy of the moving door 8 the energy storage device 12 is charged. The charged energy could thereafter be stored in the energy storage device 12 and be used for moving the door 8 from the closed position C to the open position O even if there is a power outage and the first energy transmitting device 13 is not able to charge the energy storage device 12. This also reduces the energy needed to operate the sectional door operator system 1.

If the one or more sensors identify a person or an object in the path of the door 8, the sensors will send a signal to the control unit 20 that will control the door 8 and stop the movement of the door 8. The control unit 20 thereafter controls the door 8 to return to the open position O or to hold until the person or object has moved and control the door to continue to the closed position. As the door 8 moves towards the floor 23 it reaches the closed position C. In the closed position C, the energy storage device 12 of the drive unit will be aligned with the first energy transmitting device 13 and the energy storage device 12 will be charged.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more moveable door member not limited to any specific type. The or each such door member may, for instance, be a swing door member, a revolving door member, a sliding door member, an overhead sectional door member, a horizontal folding door member or a pull-up (vertical lifting) door member.

The invention claimed is:

1. A door operator system for opening and closing an opening, comprising:
   a door frame comprising a first frame section at a first side of the opening and a second frame section at a second side of the opening;
   a door arranged to be moved between an open (O) and closed (C) position, the door being connected to the door frame, wherein the door comprises an inner face and an outer face;
   a drive unit mounted on the inner face or the outer face, wherein the drive unit is moveably connected to first frame section and the drive unit is moveably connected to the second frame section, the drive unit comprising at least one motor connected to at least one energy storage device arranged to power the at least one motor, the drive unit being arranged to move the door from the closed position (C) to the open position (O);
   an energy transmitting device disposed in close proximity to the door and comprising a sensing element and a transmitting activation switch responsive to the sensing element; and
   an energy receiving device mounted on the inner face or the outer face,
   wherein the energy transmitting device is configured to wirelessly transmit energy to the energy receiving device mounted to the door, wherein the energy receiving device is operatively connected to the at least one energy storage device for charging said energy storage device, and wherein the sensing element detects the energy receiving device within a distance allowing for energy transfer, and in response to the detection, the activation switch activates the energy transmitting device.

2. The door operator system according to claim 1, wherein the energy storage device is a capacitor or a super capacitor.

3. The door operator system according to claim 1, wherein the energy transmitting device is a transmitting coil and the energy receiving device is a receiving coil, whereby the receiving coil receives energy wirelessly by means of induction.

4. The door operator system according to claim 1, wherein the receiving coil and the transmitting coil are at least partially encapsulated by an electrically insulating material.

5. The door operator system according to claim 1, wherein the energy transmitting device and the energy receiving device are arranged to be in an energy transferring relation by means of coming into contact during movement of the door.

6. The door operator system according to claim 1, wherein the at least one motor of the drive unit is configured to act as a generator and charge the energy storage device when the door is moved from the open position (O) to the closed position (C).

7. The door operator system according to claim 1, wherein the door comprise a plurality of horizontal and interconnected sections.

8. The door operator system according to claim 1, wherein the energy transmitting device is mounted to the door frame.

9. The door operator system according to claim 8, wherein the energy transmitting device is integrated into the door frame.

10. The door operator system according to claim 1, wherein the energy storage device is a battery, whereby the energy receiving device is connected to the battery via a battery charger mounted to the door, the battery charger being configured to charge said battery.

11. The door operator system according to claim 10, wherein the energy receiving device is connected to the battery charger and the battery by means of a wired connection.

12. The door operator system according to claim 1, wherein the energy transmitting device and the energy receiving device are arranged to be in an energy transferring relation without coming into contact.

13. The door operator system according to claim 12, wherein the energy transmitting device comprise one or more of a first energy transmitting device is arranged to transfer energy to the energy receiving device when the door is in the closed position (C), a second energy transmitting device is arranged to transfer energy to the energy receiving device when the door is in the open position (O), and a third energy transmitting device is arranged to transfer energy to the energy receiving device when the door is in an intermediate position between the closed position (C) and the open position (O).

14. The door operator system according to claim 1, wherein the drive unit at least comprises a first motor and a second motor.

15. The door operator system according to claim 14, wherein the first motor is moveably connected to the first frame section and the second motor is moveably connected to the second frame section.

16. The door operator system according to claim 1, further comprising a control unit being in operative communication with the drive unit and configured to control the operation of the drive unit.

17. The door operator system according to claim 16, wherein the control unit is mounted to the door and is connected to the energy storage device for receiving energy from said energy storage device.

18. The door operator system according to claim 16, wherein the control unit is mounted externally from the door and is configured to communicate wirelessly with the drive unit.

19. A door operator system for opening and closing an opening, comprising:
   a door frame comprising a first frame section at a first side of the opening and a second frame section at a second side of the opening;
   a door arranged to be moved between an open (O) and closed (C) position, the door being connected to the door frame, wherein the door comprises an inner face and an outer face;
   a drive unit mounted on the inner face or the outer face, wherein the drive unit is moveably connected to first frame section and the drive unit is moveably connected to the second frame section, the drive unit comprising at least one motor connected to at least one energy storage device arranged to power the at least one motor, the drive unit being arranged to move the door from the closed position (C) to the open position (O);
   an energy transmitting device disposed in close proximity to the door; and
   an energy receiving device mounted on the inner face or the outer face and comprising a sensing element and a receiving activation switch responsive to the sensing element,
      wherein the energy transmitting device is configured to wirelessly transmit energy to the energy receiving device mounted to the door, wherein the energy receiving device is operatively connected to the at least one energy storage device for charging said energy storage device, and wherein the sensing element detects the energy transmitting device within a distance allowing for energy transfer, and in response to the detection, the activation switch activates the energy receiving device.

* * * * *